(12) United States Patent
Tanaka et al.

(10) Patent No.: US 10,099,558 B2
(45) Date of Patent: Oct. 16, 2018

(54) MOTOR DRIVING APPARATUS

(71) Applicants: MICROSPACE CORPORATION, Tokyo (JP); TAIYO YUDEN CO., LTD., Tokyo (JP)

(72) Inventors: Masato Tanaka, Tokyo (JP); Yasuo Hosaka, Tokyo (JP); Hirokazu Shirakawa, Tokyo (JP); Taichi Yanaoka, Tokyo (JP)

(73) Assignees: MICROSPACE CORPORATION, Tokyo (JP); TAIYO YUDEN CO., LTD., Tokyo (JP)

( * ) Notice: Subject to any disclaimer, the term of this patent is extended or adjusted under 35 U.S.C. 154(b) by 331 days.

(21) Appl. No.: 15/002,512

(22) Filed: Jan. 21, 2016

(65) Prior Publication Data
US 2016/0221445 A1    Aug. 4, 2016

(30) Foreign Application Priority Data

Feb. 3, 2015   (JP) .................. 2015-018974

(51) Int. Cl.
*B62M 6/45* (2010.01)
*B60L 3/10* (2006.01)
(Continued)

(52) U.S. Cl.
CPC ............... *B60L 3/10* (2013.01); *B62M 6/40* (2013.01); *B62M 6/45* (2013.01); *B62M 6/80* (2013.01); *Y02T 10/7275* (2013.01)

(58) Field of Classification Search
CPC . B62M 6/40; B62M 6/45; B62M 6/60; B62M 6/65; B60W 10/08; B60W 10/10
See application file for complete search history.

(56) References Cited

U.S. PATENT DOCUMENTS 5,836,414 A * 11/1998 Seto .................. B62M 6/45
                                                180/206.1
9,120,531 B2  9/2015 Tanaka et al.
(Continued)

FOREIGN PATENT DOCUMENTS

CN    1145314 A    3/1997
CN    2605148 Y    3/2004
(Continued)

OTHER PUBLICATIONS

Taiwan Office Action dated Dec. 26, 2016 in Taiwan Patent Application No. 10521584450.
(Continued)

*Primary Examiner* — Edwin A Young
(74) *Attorney, Agent, or Firm* — Staas & Halsey LLP

(57) ABSTRACT

A motor driving apparatus includes a driving unit configured to drive a motor according to a torque inputted by a rotation input from a human being; and a controller configured to control driving of the driving unit according to a relationship between an accumulated value of first amounts that correspond to the rotation input from the human being and an accumulated value of second amounts that correspond to rotation of a rotating object driven by the motor. The controller may be further configured to cause the driving unit to suppress driving of the motor when an accumulated difference that is calculated by subtracting the accumulated value of the second amounts from the accumulated value of the first amounts is equal to or less than a predetermined threshold.

16 Claims, 11 Drawing Sheets

(51) Int. Cl.
*B62M 6/40* (2010.01)
*B62M 6/80* (2010.01)

(56) References Cited

U.S. PATENT DOCUMENTS

| | | | |
|---|---|---|---|
| 9,162,730 | B2 | 10/2015 | Tanaka et al. |
| 2007/0290648 | A1 | 12/2007 | Shimojo et al. |
| 2012/0316710 | A1* | 12/2012 | Saida ................ B62M 6/45 |
| | | | 701/22 |
| 2014/0297078 | A1 | 10/2014 | Yonezaki et al. |

FOREIGN PATENT DOCUMENTS

| | | | |
|---|---|---|---|
| CN | 104071032 | A | 10/2014 |
| EP | 0 728 663 | A2 | 8/1996 |
| JP | 11-18215 | | 1/1999 |
| JP | 2000-333311 | | 11/2000 |
| JP | 2000-333311 | A | 11/2000 |
| JP | 2001-114184 | | 4/2001 |
| JP | 2003-104277 | | 4/2003 |
| JP | 2004-243921 | | 9/2004 |
| JP | 2007-191114 | | 8/2007 |
| TW | 200624663 | | 7/2006 |
| TW | 201501998 | | 1/2015 |

OTHER PUBLICATIONS

Extended European Search Report dated Nov. 18, 2016 in corresponding European Patent Application No. 16152973.0.
Chinese Office Action dated Aug. 1, 2017 in corresponding Chinese Patent Application 201610071676.9.

\* cited by examiner

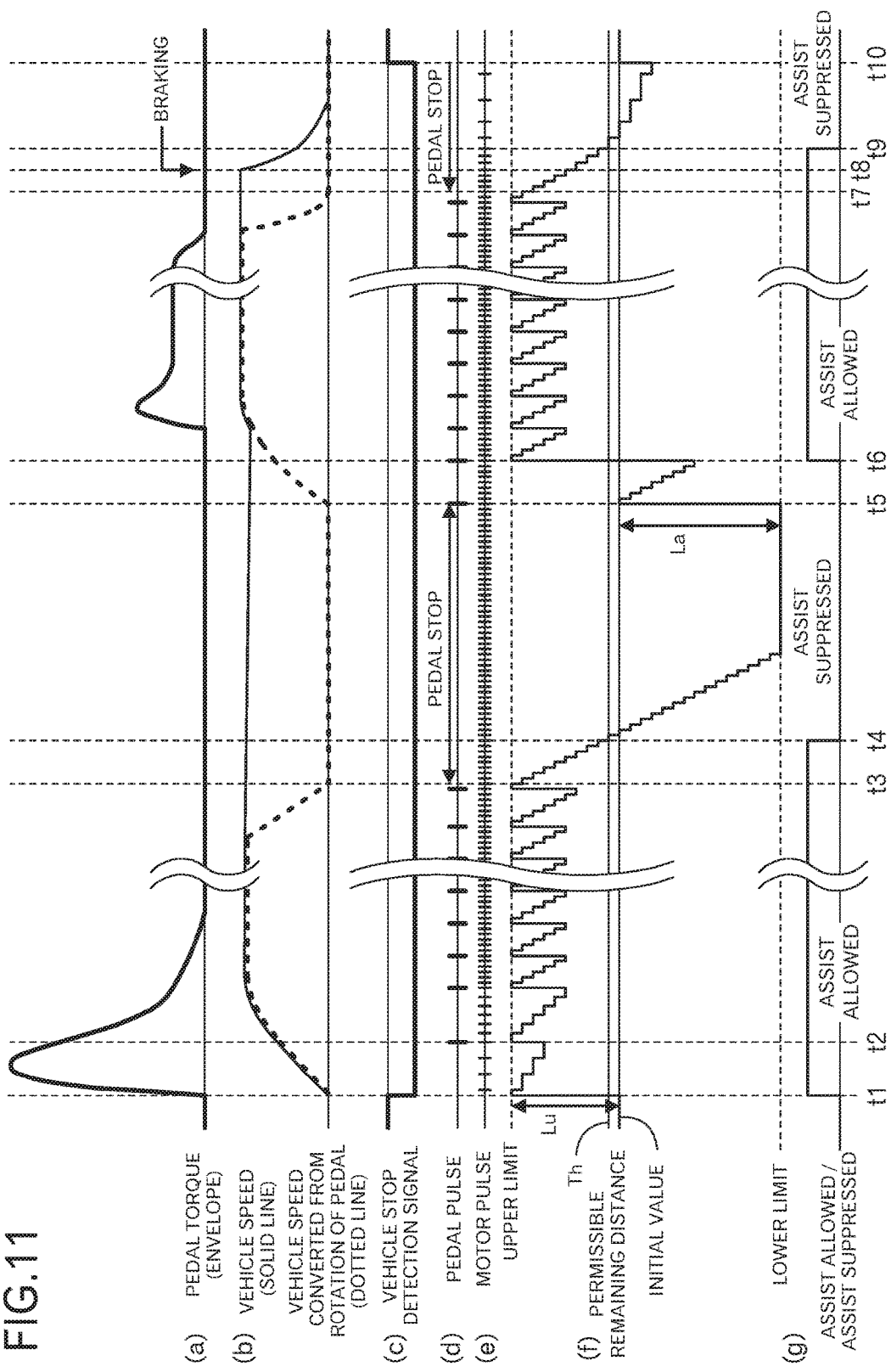

MOTOR DRIVING APPARATUS

CROSS-REFERENCE TO RELATED APPLICATIONS

This application is based upon and claims the benefit of priority of the prior Japanese Patent Application No. 2015-018974, filed on Feb. 3, 2015, the entire contents of which are incorporated herein by reference.

FIELD

This invention relates to a motor driving apparatus.

BACKGROUND

As a method for detecting over-rotation due to a slip of a motor-driven wheel in an electrically assisted vehicle or the like to prevent a motor from overdriving, following methods are known. (1) An equivalent converted speed of a pedal-driven wheel and a speed of the motor-driven wheel are calculated and compared based on pedal rotation pulses and motor rotation pulses, and when the speed of the motor-driven wheel is too fast, it is determined that the slip of the motor-driven wheel or over-rotation occurred and the motor driving is suppressed. (2) An acceleration of the motor-driven wheel is calculated from the number of rotations of the motor, and when the acceleration is greater than the upper limit that is normally probable, it is determined that the slip of the motor-driven wheel or over-rotation occurred and the motor driving is suppressed.

However, because, in the comparison of the speeds like the method (1), errors of the detection accuracy for the speeds, an error of the wheel radius and margins that include a margin for a handlebar steering angle are considered, it is possible to suppress the motor speed to the extent of the margins when the wheel is racing due to the slip, however it is difficult to completely stop the motor.

More specifically, because, in the comparison of the speeds like the method (1), various kinds of error factors have to be considered in order not to cause any trouble due to the error detection, a quite large fixed-rate speed margin or fixed-quantity speed margin is set. The error factors include a margin for unknown gear shift, a difference between front and rear wheel rotations due to the handlebar steering angle (especially, when a rider makes a U turn on a narrow road or the like, the handlebar is largely turned. Therefore, the difference in the number of rotations between the front wheel and the rear wheel becomes large, and if the rear wheel is the pedal-driven wheel and the front wheel is the motor-driven wheel, dozens of percents or more are set as the margin for the handlebar steering angle.). Furthermore, the error factors also include an error in the tire radius, a tire elastic slip (which is caused by the deformation of the rubber due to the driving force, and is not the slip.), errors for the detection accuracy of both speeds, a quantization error in the detection or calculation, and the like.

Therefore, when the rotation speed of the motor (specifically, the motor-driven wheel) exceeds an originally permissible speed, it may be impossible to suppress the motor rotation. In a notable example, the motor rotation may be permitted to the extent of the speed margin, even when the pedal rotation is zero.

In addition, when the motor-driven wheel is not racing, the difference between the speeds is naturally within the margin. Therefore, even when the pedal does not rotate, however, a huge torque is outputted, it is impossible to suppress the torque.

Even in the method (2), when the load is not so light and the motor gradually performs the over-driving, or when the over-rotation has occurred and the wheel-rotation speed becomes fast, however, the large acceleration is not detected, it is difficult to detect the over-driving.

Thus, there are a lot of cases where the assist driving cannot be suppressed even when the assist driving should be suppressed, and if the motor-driving is not stopped even when the motor-driving should be stopped, a large torque may be outputted, even though the number of rotations is less.

Especially, when there is any trouble in a torque sensor or relating to the torque sensor (e.g. when the torque is applied to the pedal while locking the rear wheel by the key, when the torque sensor gets broken, when clogging due to some extraneous material or mud occurs in the torque sensor, or the like), a situation may occur where the over-rotation of the motor-driven wheel is permitted while recognizing the large torque input in error.

Patent Document 1: Japanese Laid-open Patent Publication No. 2004-243921

Namely, there is no technique for effectively suppressing the over-driving of the motor.

SUMMARY

A motor driving apparatus relating to this invention has a driving unit to drive a motor according to a torque inputted by a rotation input of a human being; and a controller to control driving of the motor by the driving unit according to a relationship between an accumulated value of first amounts that correspond to the rotation input of the human being and an accumulated value of second amounts that correspond to rotation of a rotating object driven by the motor.

BRIEF DESCRIPTION OF DRAWINGS

FIG. 11 is a diagram to explain processing contents relating to the fourth embodiment.

DESCRIPTION OF EMBODIMENTS

Embodiment 1

Figure 1:
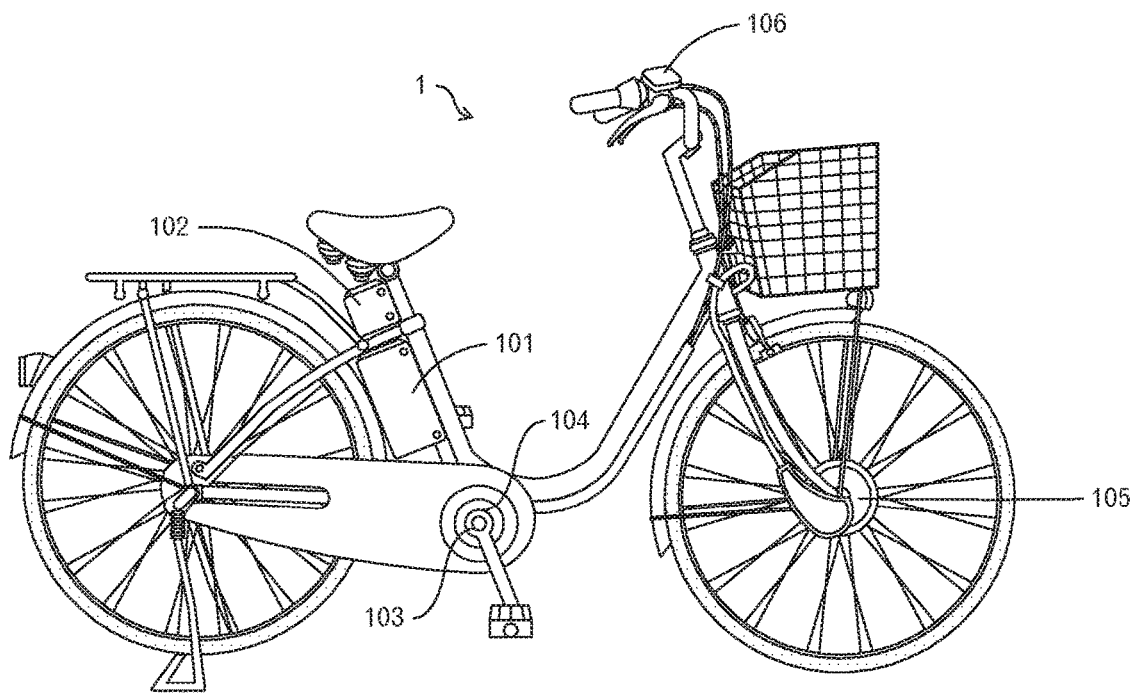
FIG. 1 is a diagram depicting an exterior view of a bicycle with a motor.

FIG. 1 illustrates an exterior view of a bicycle with a motor, which is an example of an electrically assisted vehicle in this embodiment. A motor driving apparatus is mounted on this bicycle 1 with the motor. The motor driving apparatus has a secondary battery 101, a motor driving control device 102, a toque sensor 103, a pedal rotation sensor 104, a motor 105 and an operation panel 106. The bicycle 1 with the motor also has a freewheel and a transmission.

The secondary battery 101 may be, for example, a lithium ion secondary battery with a maximum supply voltage of 24 V (when fully charged), but other types of batteries such as a lithium ion polymer secondary battery, or a nickel-metal hydride chargeable battery may be used.

The torque sensor 103 is provided on a wheel, which is installed in the crankshaft, detects a pedal force from the rider, and outputs this detection result to the motor driving control device 102. Similarly to the torque sensor 103, the pedal rotation sensor 104 is provided in the wheel, which is installed on the crankshaft, and outputs pulse signals, which correspond to the rotation, to the motor driving control device 102.

The motor 105 is, for example, a well-known three-phase direct current brushless motor, and mounted on the front wheel of the bicycle 1 with the motor. The motor 105 rotates the front wheel, and also a rotor is connected directly or via a reducer to the front wheel so as to rotate according to the rotation of the front wheel. Furthermore, the motor 105 is equipped with a rotation sensor such as a hall effect sensor to output rotation information of the rotor (i.e. a hall signal) to the motor driving control device 102.

The operation panel 106 accepts, from a user, an instruction input regarding whether or not the assist should be performed, for example, and an input of a desired assist ratio or the like if the assist should be performed, and outputs the instruction input and the like to the motor driving control device 102. In addition, the operation panel 106 may output a signal representing a transmission gear ratio (also called "gear ratio") of the transmission to the motor driving control device 102.

Figure 2:
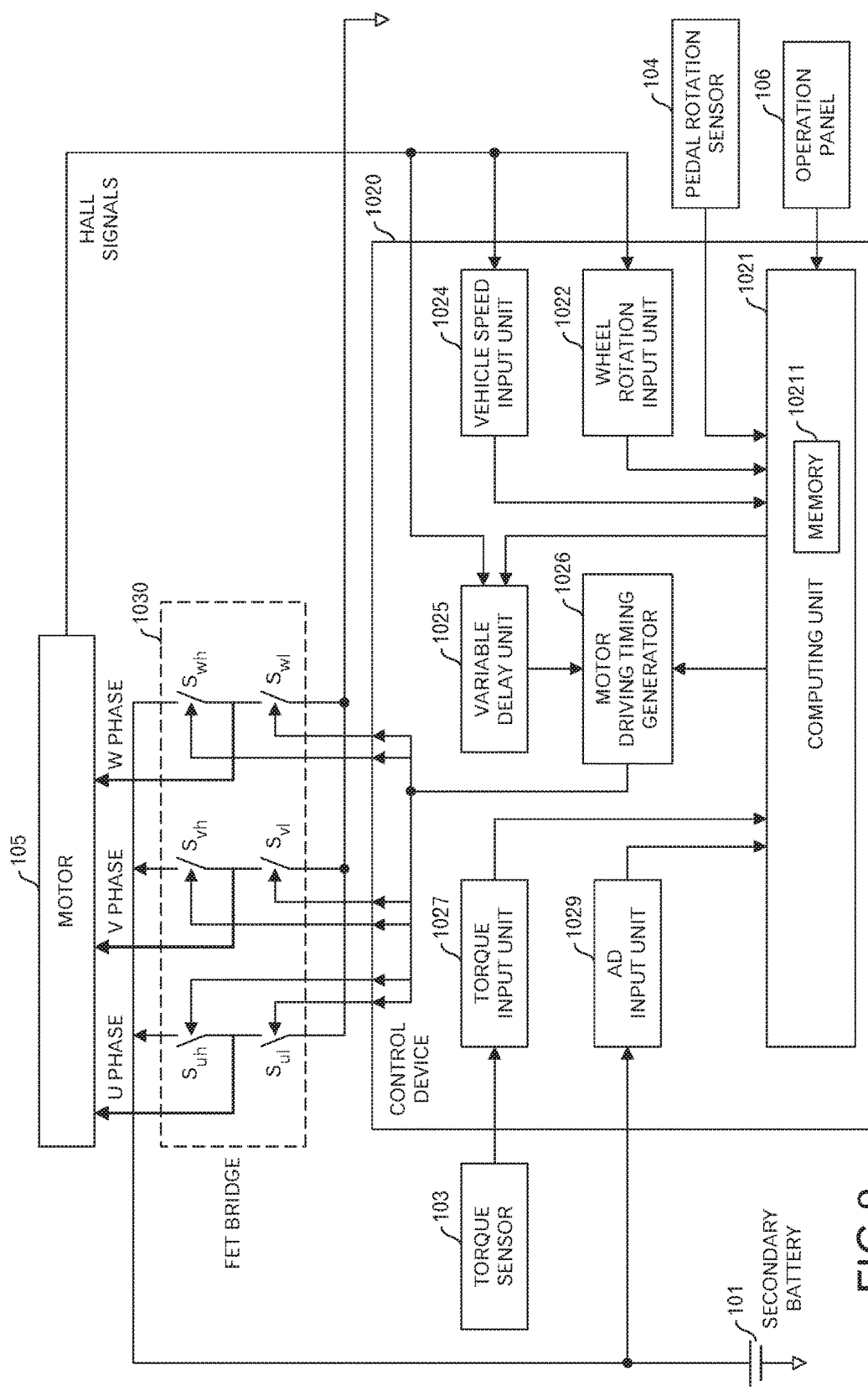
FIG. 2 is a functional diagram of a motor driving control device.

FIG. 2 illustrates a configuration related to the motor driving control device 102 of this kind of bicycle 1 with the motor. The motor driving control device 102 includes a control device 1020, and a FET (Field Effect Transistor) bridge 1030. The FET bridge 1030 includes a high side FET ($S_{uh}$) and a low side FET ($S_{ul}$) to perform switching of a U phase of the motor 105, a high side FET ($S_{vh}$) and a low side FET ($S_{vl}$) to perform switching of a V phase of the motor 105, and a high side FET ($S_{wh}$) and a low side FET ($S_{wl}$) to perform switching of a W phase of the motor 105. This FET bridge 1030 is configured as a portion of the complementary type switching amplifier.

In addition, the control device 1020 includes a computing unit 1021, a wheel rotation input unit 1022, a vehicle speed input unit 1024, a variable delay unit 1025, a motor driving timing generator 1026, a torque input unit 1027 and an AD (Analog-Digital) input unit 1029.

The computing unit 1021 performs computations described later using an input from the operation panel 106 (e.g. gear ratio, on/off of the assist, a desired assist ratio and the like), an input from the wheel rotation input unit 1022, an input from the vehicle speed input unit 1024, an input from the torque input unit 1027, pulse signals from the pedal rotation sensor 104, and an input from the AD input unit 1029. After that, the computing unit 1021 outputs computation results to each of the motor driving timing generator 1026 and the variable delay unit 1025. The computing unit 1021 includes a memory 10211, and the memory 10211 stores various data used in the computing, data currently in processing, and other data. Furthermore, the computing unit 1021 may be realized by executing a program with a processor, and in this case, the program may be recorded in the memory 10211.

The vehicle speed input unit 1024 calculates a current speed (also called "the speed of the motor-driven wheel") from the hall signals outputted by the motor 105, and outputs the current speed to the computing unit 1021. The wheel rotation input unit 1022 generates a signal generated by frequency-dividing at least any of hall signals, for example, and outputs the generated signal to the computing unit 1021. The torque input unit 1027 digitizes signals corresponding to the pedal pressure from the torque sensor 103, and outputs the digitized signal to the computing unit 1021. The AD input unit 1029 digitizes an output voltage from the secondary battery 101, and outputs the digitized output voltage to the computing unit 1021. Moreover, the memory 10211 may be provided separately from the computing unit 1021.

The computing unit 1021 outputs an advance value as the computing result to the variable delay unit 1025. The variable delay unit 1025 adjusts the phases of the hall signals based on the advance value received from the computing unit 1021, and outputs the adjusted hall signals to the motor driving timing generator 1026. The computing unit 1021 outputs, as the computing result, a PWM (Pulse Width Modulation) code corresponding to the PWM duty ratio, for example, to the motor driving timing generator 1026. The motor driving timing generator 1026 generates switching signals and outputs these to respective FETs included in the FET bridge 1030, based on the adjusted hall signals from the variable delay unit 1025 and the PWM code from the computing unit 1021.

The basic operation of the motor driving is described in U.S. Pat. No. 9,162,730, and is not a main portion of this embodiment. Therefore, the explanation is omitted here. U.S. Pat. No. 9,162,730 is incorporated herein by reference.

This embodiment pays attention to a point that, in the normal running, an accumulated running distance that is presumed from the pedal rotation is identical to the an accumulated running distance that is presumed from the rotation of the motor-driven wheel, however, when an abnormal state occurs such as when the motor-driven wheel rotates excessively, such a relationship does not come into effect. In other words, the occurrence of the abnormal state is detected from the relationship between the accumulated running distance presumed from the pedal rotation and the accumulated running distance presumed from the rotation of the motor-driven wheel, and when the occurrence of the abnormal state is detected, the assist driving by the motor is suppressed. More specifically, a driving torque is set to be zero.

Figure 3:
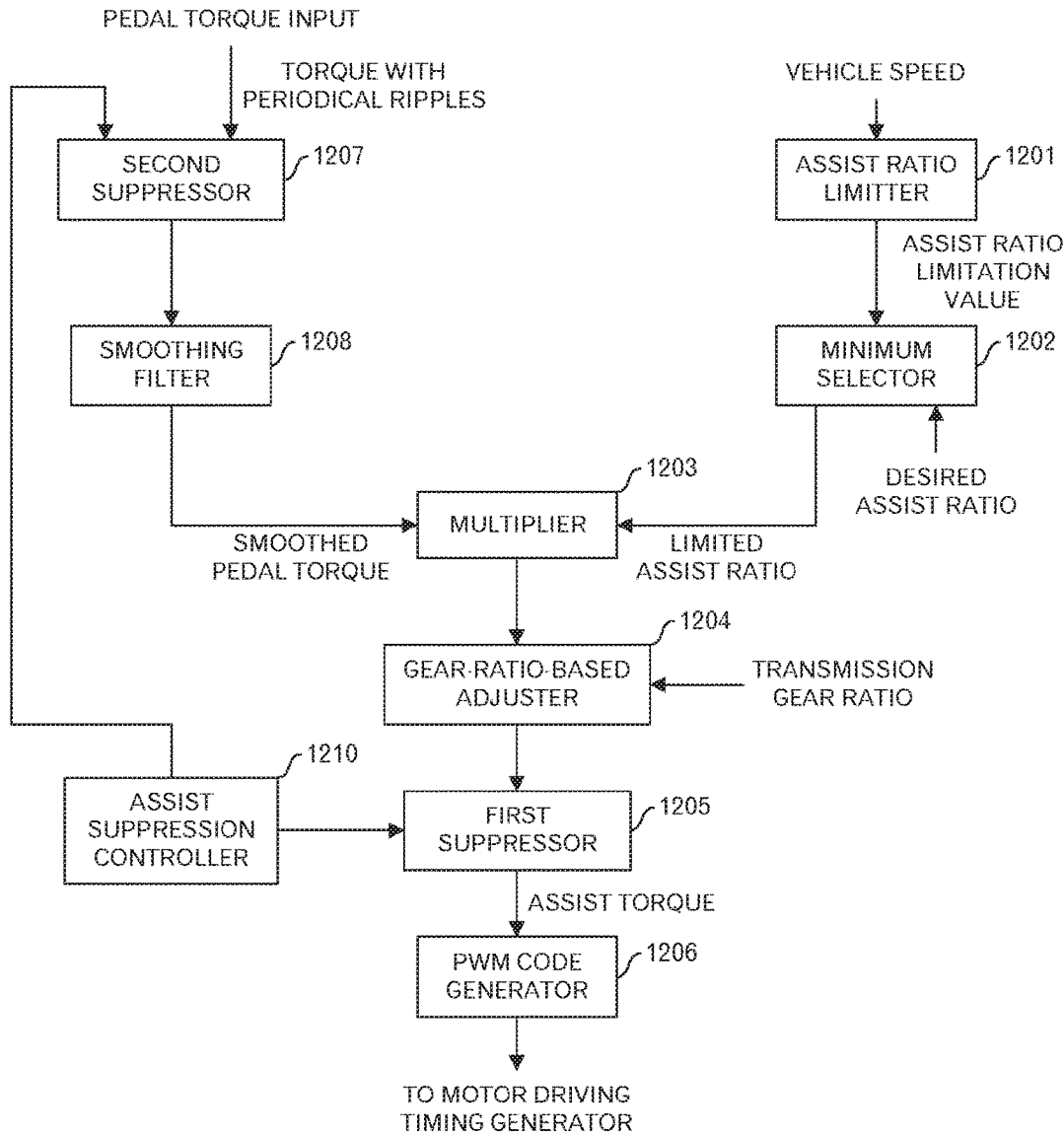
FIG. 3 is a functional block diagram of a computing unit relating to a first embodiment.

For this reason, in this embodiment, the computing unit 1021 has a configuration as illustrated in FIG. 3. The computing unit 1021 has an assist ratio limiter 1201, a minimum selector 1202, a multiplier 1203, a gear-ratio-based adjuster 1204, a first suppressor 1205, a PWM code generator 1206, a second suppressor 1207, a smoothing filter 1208 and an assist suppression controller 1210. For example, elements other than the assist suppression controller 1210 are also called a driving unit of the motor.

The assist ratio limitter 1201 identifies an assist ratio limitation value corresponding to the current vehicle speed from the vehicle speed input unit 1024, and outputs the identified assist ratio limitation value to the minimum selector 1202. For example, the assist ratio limitter 1201 outputs an assist ratio limitation value proportional to the vehicle speed up to a predetermined vehicle speed, however, fixes an assist ratio limitation value when the vehicle speed exceeds the predetermined vehicle speed. The minimum selector 1202 selects a minimum value of the assist ratio limitation value from the assist ratio limitter 1201 and the desired assist ratio inputted from the operation panel 106, for example, and outputs the selected value as the limited assist ratio to the multiplier 1203.

On the other hand, in response to an assist allowance instruction from the assist suppression controller 1210, the second suppressor 1207 outputs a pedal input torque (a pedal input torque that has periodical ripples and is also called "torque with periodical ripples".) from the torque input unit 1027 to the smoothing filter 1208. On the other hand, in response to an assist suppression instruction from the assist suppression controller 1210, the second suppressor 1207 suppresses the output of the pedal input torque to the smoothing filter 1208, namely, outputs zero.

The smoothing filter 1208 calculates, for example, a moving average or a weighted moving average from the pedal input torque outputted from the second suppressor 1207, and outputs the smoothed pedal torque to the multiplier 1203.

The multiplier 1203 multiplies the smoothed pedal torque from the smoothing filter 1208 and the limited assist ratio from the minimum selector 1202, and outputs the multiplication result to the gear-ratio-based adjuster 1204.

The gear-ratio-based adjuster 1204 calculates an assist torque by dividing the output of the multiplier 1203 by the transmission gear ratio of the transmission included in the electrically assisted vehicle, and outputs the assist torque to the first suppressor 1205. When the transmission is incorporated only in the pedal driving path, the transmission gear ratio is inputted. When the transmission is incorporated commonly in the pedal driving path and the motor driving path, the transmission gear ratio is a constant fixed value.

In response to the assist allowance instruction from the assist suppression controller 1210, the first suppressor 1205 outputs the assist torque from the gear-ratio-based adjuster 1204 to the PWM code generator 1206. On the other hand, in response to the assist suppression instruction from the assist suppression controller 1210, the first suppressor 1205 suppresses the output of the assist torque to the PWM code generator 1206.

The PWM code generator 1206 converts the assist torque from the first suppressor 1205 to the PWM code used in the motor driving timing generator 1026, and outputs the PWM code to the motor driving timing generator 1026. Such conversion is described in detail in U.S. Pat. No. 9,120,531, and is not a main portion of this embodiment. Therefore, the explanation is omitted here. U.S. Pat. No. 9,120,531 is incorporated herein by reference.

When the assist suppression controller 1210 detects the occurrence of the abnormal state based on the relationship between the accumulated running distance presumed from the pedal rotation and the accumulated running distance presumed from the rotation of the motor-driven wheel, the assist suppression controller 1210 outputs the assist suppression instruction, and when the assist suppression controller 1210 does not detect the occurrence of the abnormal state, the assist suppression controller 1210 outputs the assist allowance instruction.

The second suppressor 1207 may not be provided. In addition, instead of the second suppressor 1207, an operation to flash all values loaded onto the smoothing filter 1208 may be performed. Furthermore, the output of the smoothing filter 1208 may be caused to be zero.

Figure 4:
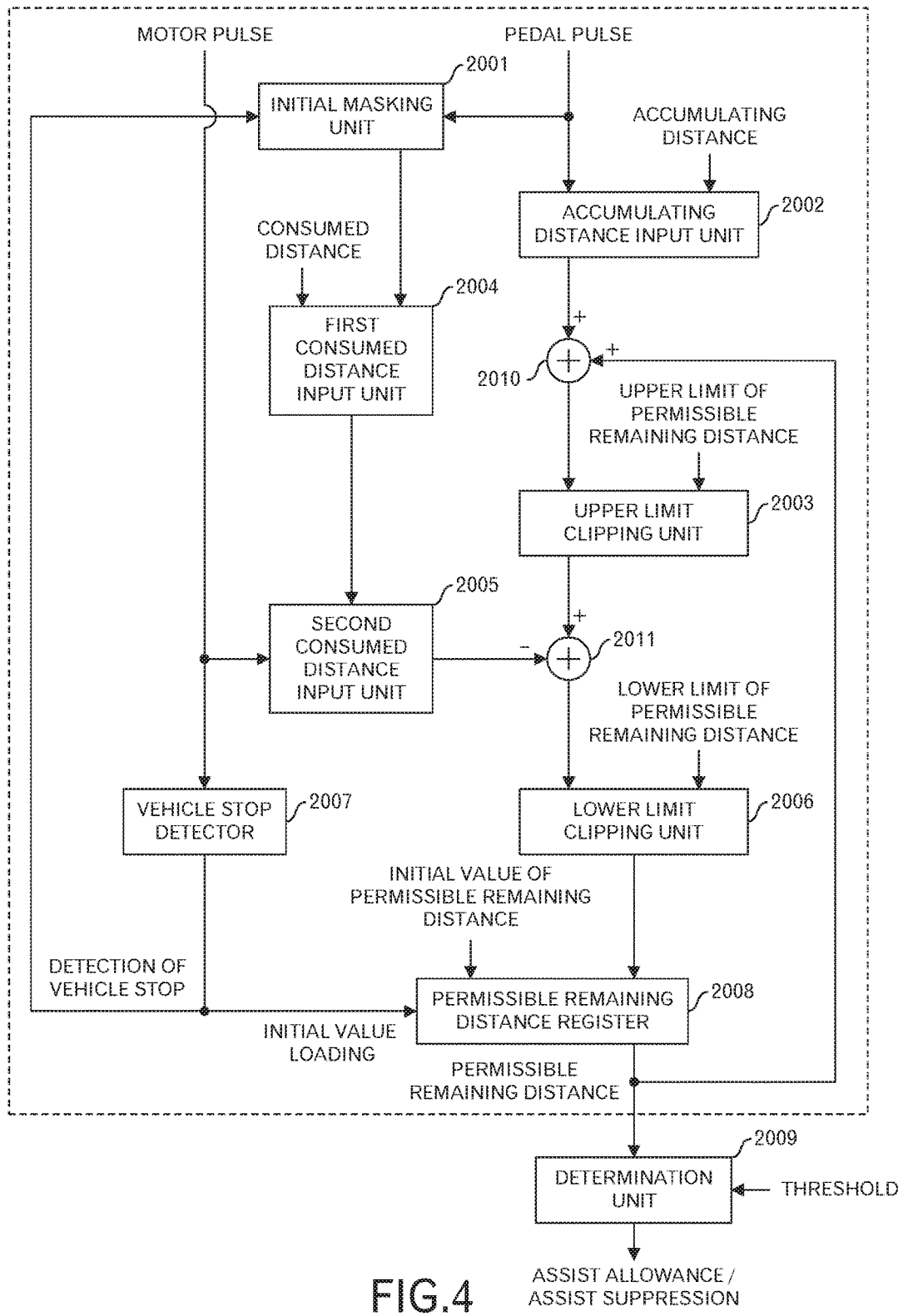
FIG. 4 is a functional block diagram of an assist suppression controller relating to the first embodiment.

Next, a specific configuration of the assist suppression controller 1210 will be explained by using FIG. 4. The assist suppression controller 1210 has an initial masking unit 2001, an accumulating distance input unit 2002, a first consumed distance input unit 2004, an upper limit clipping unit 2003, a second consumed distance input unit 2005, a lower limit clipping unit 2006, a vehicle stop detector 2007, a permissible remaining distance register 2008, a determination unit 2009, and adders 2010 and 2011.

The accumulating distance input unit 2002 outputs the accumulating distance according to the pedal pulses, which are outputted from the pedal rotation sensor 104 according to the rotation of the pedal. The accumulated distance is also called "charge distance" and is calculated, for example, by (running distance per a pedal pulse in the fastest gear ratio+margin)*"2".

When the adder 2010 accepts the accumulating distance as an output of the accumulating distance input unit 2002, the adder 2010 adds the accumulating distance and the output of the permissible remaining distance register 2008, and outputs the addition result to the upper limit clipping unit 2003. Thus, the adder 2010 performs the addition per a pedal pulse.

When the upper limit clipping unit 2003 receives the output of the adder 2010, the upper limit clipping unit 2003 compares the upper limit of the permissible remaining distance with the output of the adder 2010, and when the output of the adder 2010 is less than the upper limit of the permissible remaining distance, the upper limit clipping unit 2003 outputs the output of the adder 2010 to the adder 2011, and when the upper limit of the permissible remaining distance is less than the output of the adder 2010, the upper limit clipping unit 2003 outputs the upper limit of the permissible remaining distance to the adder 2011. The upper limit of the remaining distance is determined, for example, by calculating (a threshold used by the determination unit 2009+a running distance per a pedal pulse+margin).

On the other hand, the motor pulse is a pulse signal that is frequency-divided by the wheel rotation input unit 1022, for example, and are inputted into the second consumed distance input unit 2005 and the vehicle stop detector 2007. The vehicle stop detector 2007 has a counter to measure intervals of the motor pulses, and when a phenomenon is detected that the interval of the motor pulses becomes long to the extent that the count value of the counter is saturated, the vehicle stop detector 2007 determines that the electrically assisted vehicle stopped, and outputs a vehicle stop detection signal to the initial masking unit 2001. The vehicle stop detection signal is also outputted to the permissible remaining distance register 2008, however, in this case, the vehicle stop detection signal is used to an initial value loading signal.

Initially or after receiving the vehicle stop detection signal from the vehicle stop detector 2007, the initial masking unit 2001 outputs a suppression signal so as not to perform the addition in the adder 2011 to the first consumed distance input unit 2004 until the pedal pulse is detected. On the other hand, when the initial masking unit 2001 detects the pedal pulse after receiving the vehicle stop detection signal from the vehicle stop detector 2007, the initial masking unit 2001 outputs an allowance signal to cause the adder 2011 to perform the addition to the first consumed distance input unit 2004.

When the allowance signal is inputted from the initial masking unit 2001, the first consumed distance input unit 2004 outputs the consumed distance to the second consumed distance input unit 2005. On the other hand, when the suppression signal is inputted from the initial masking unit 2001, the first consumed distance input unit 2004 outputs the suppression signal to the second consumed distance input unit 2005. The consumed distance is a running distance per a motor pulse, for example.

When the second consumed distance input unit 2005 has received the consumed distance from the first consumed distance input unit 2004 and also receives the motor pulse, the second consumed distance input unit 2005 outputs the consumed distance to the adder 2011. On the other hand, when receiving the suppression signal from the first consumed distance input unit 2004, the second consumed distance input unit 2005 outputs zero to the adder 2011.

In response to the motor pulse, the adder 2011 subtracts the output value (zero or the consumed distance) from the second consumed distance input unit 2005 from the value outputted from the upper limit clipping unit 2003, and outputs the calculated value to the lower limit clipping unit 2006.

The lower limit clipping unit 2006 compares the output from the adder 2011 with the lower limit of the permissible remaining distance, and when the output from the adder 2011 is less than the lower limit of the permissible remaining distance, the lower limit clipping unit 2006 outputs the lower limit of the permissible remaining distance to the permissible remaining distance register 2008. On the other hand, when the output from the adder 2011 is equal to or greater than the lower limit of the permissible remaining distance, the lower limit clipping unit 2006 outputs the output from the adder 2011 to the permissible remaining distance register 2008 as it is. The lower limit of the permissible remaining distance is {an initial value of the permissible remaining distance−(the accumulating distance or more)}, for example. The initial value of the permissible remaining distance is a reference value, for example, "0".

The permissible remaining distance register 2008 basically stores the output from the lower limit clipping unit 2006. However, when the vehicle stop detector 2007 outputs the vehicle stop detection signal, the initial value of the permissible remaining distance is loaded.

Thus, the permissible remaining distance register 2008 is asynchronously updated each motor pulse or each pedal pulse. In addition, elements within a range surrounded by a dotted line in FIG. 4 operate for each motor pulse or each pedal pulse.

The determination unit 2009 compares the output of the permissible remaining distance register 2008 (i.e. the permissible remaining distance) with a threshold, and when the permissible remaining distance is equal to or less than the threshold, the determination unit 2009 outputs the assist suppression instruction, and when the permissible remaining distance is greater than the threshold, the determination unit 2009 outputs the assist allowance instruction. The determination unit 2009 performs a processing for each its own calculation frame period, instead of each motor pulse or each pedal pulse.

In this embodiment, the accumulating distance and the consumed distance are adjusted so that a ratio of the accumulating distance and the consumed distance is identical with a ratio of the pedal pulse interval in case of the fastest gear and the motor pulse interval when the pedal torque generated by the pedaling is applied to the ground through the pedal-driven wheel (which may be identical with or different from the motor-driven wheel). On the other hand, when the transmission is inserted commonly in both of the pedal driving path and the motor driving path, the ratio of both pulse intervals always becomes constant regardless of the gear position.

As this embodiment assumes, in case where the transmission is inserted only in the pedal driving path, however, is not inserted in the motor driven path, when the current gear position is slower than the fastest gear position, the number of pedal pulses for the same running distance increases. Therefore, when comparing the pedal pulse frequencies in the same vehicle speed, the pedal pulse frequency relatively increases, and the number of times when the permissible remaining distance reaches the upper limit of the permissible remaining distance increases. In such a case, the interval between the upper limit value of the permissible remaining distance and the initial value of the permissible remaining distance does not change, the over-running distance from the stop of the pedal to the suppression of the assist does not change. Therefore, there is no problem with respect to a matter that the fastest gear is assumed in the assist suppression controller 1210.

Figure 5:
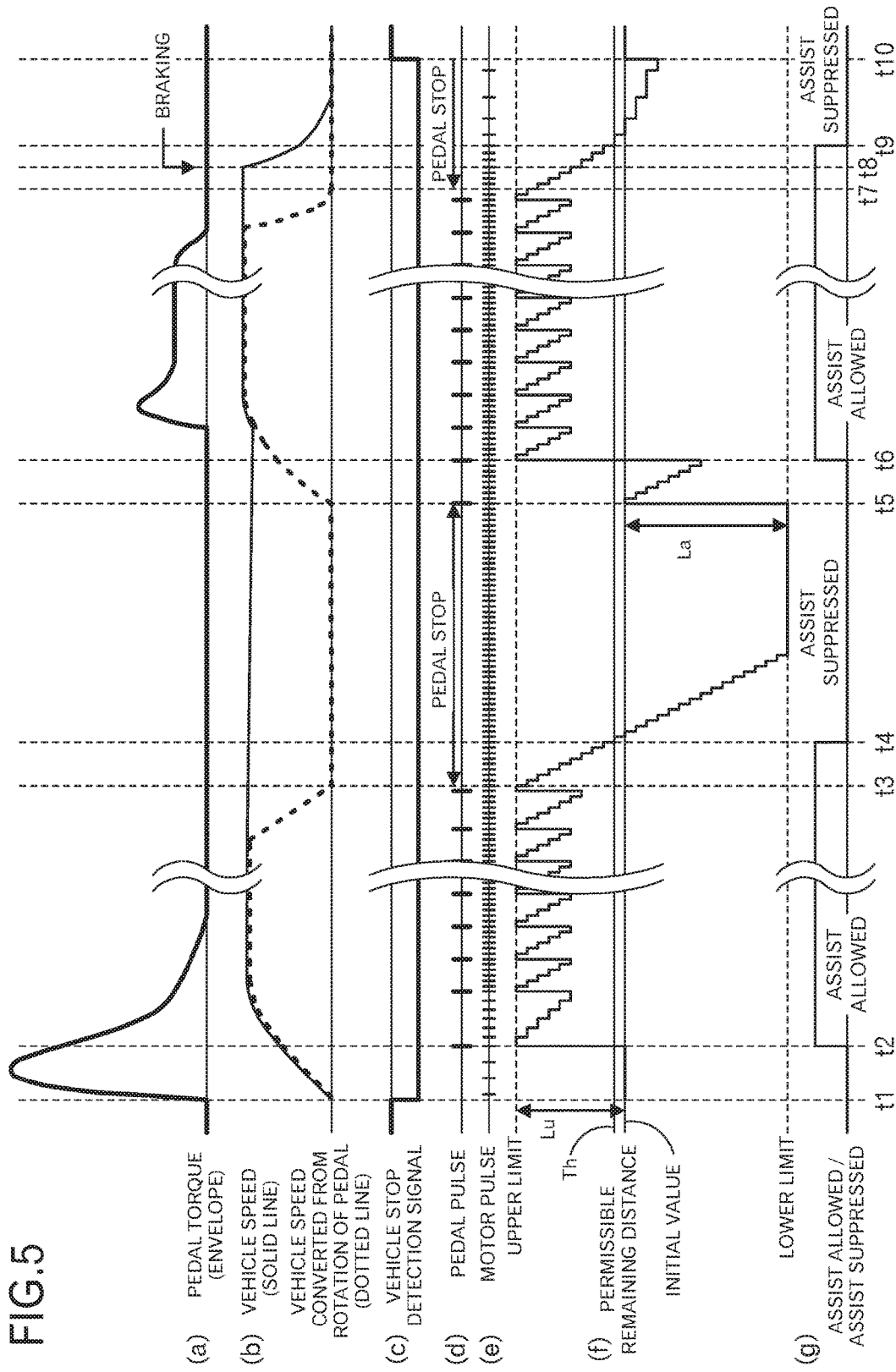
FIG. 5 is a diagram to explain processing contents of the first embodiment.

Next, the operation of the assist suppression controller 1210 will be explained by using FIG. 5. In FIG. 5, the time elapses from left to right.

(a) in FIG. 5 represents a temporal change of the pedal torque (more specifically, its envelope), (b) represents that the vehicle speed (solid line) and the vehicle speed converted from the pedal rotation (dotted line) and (c) represents a temporal change of the vehicle stop detection signal ("0" in the running and "1" in the stop of the vehicle).

Furthermore, in FIG. 5, (d) represents timings of the pedal pulses by bars, and (e) represents timings of the motor pulses by bars. (f) in FIG. 5 represents a temporal change of the permissible remaining distance, and (g) represents a temporal change of a signal (here, "0" represents the suppression, and "1" represents the allowance.) representing an assist allowance instruction or assist suppression instruction.

In this example, the user begins pedaling at time t1, the electrically assisted vehicle begins running and the rotation of the pedal is stopped at time t3 when a certain speed is obtained. After that, the user begins the pedaling again at time t5, and the rotation of the pedal is stopped again at time t7, and the braking is performed at time t8, and the vehicle is stopped at time t10.

As illustrated in (a) and (b) in FIG. 5, when the pedal torque is firstly applied by pedaling, the vehicle speed for the motor driven wheel increases together with the vehicle speed converted from the pedal rotation. When the vehicle speed and the vehicle speed converted from the pedal rotation become a speed desired by a rider, it becomes a state where the pedaling is performed, however, the torque is not applied. Then, when the rotation of the pedal is decreased, the vehicle speed starts to be apart from the vehicle speed converted from the pedal rotation, and when the rotation of the pedal is stopped at the time t3, the vehicle speed gradually decreases. After that, when the rider begins pedaling again at the time t5, the vehicle speed converted from the pedal rotation increases again, and when the vehicle speed converted from the pedal rotation becomes identical with the vehicle speed, the pedal torque begins to be applied, and the vehicle speed and the vehicle speed converted from the pedal rotation are similarly increased. After that, the torque is not applied at the time t7 and the vehicle speed converted from the pedal rotation becomes zero, and when the braking is performed at time t8, and the vehicle speed also decreases.

As illustrated in (c) in FIG. 5, up to the time t1 and after the time t10, the vehicle stop detection signal is "1" because the vehicle stops, and the vehicle is running from the time t1 to the time t10.

Furthermore, as illustrated in (d) in FIG. 5, the pedal pulses are generated according to the rotation of the pedal, not at regular intervals, and the motor pulses are also generated according to the rotation of the motor driven wheel, not at regular intervals. However, the motor pulses are generated very frequently. Therefore, (e) in FIG. 5 illustrates a state where the motor pulses are generated almost at regular intervals except for portions where the intervals largely change.

As illustrated in (f) in FIG. 5, the permissible remaining distance remains the initial value of the permissible remaining distance until the time t2 when the pedal pulse is initially detected, however, the permissible remaining distance increases by the accumulating distance La at the time t2. However, because the permissible remaining distance exceeds the upper limit Lu of the permissible remaining distance, the permissible remaining distance is clipped to the upper limit Lu. Then, as illustrated in (g) in FIG. 5, because the permissible remaining distance exceeds the threshold Th at the time t2, the assist allowance signal is outputted.

After that, the permissible remaining distance decreases by the consumed distance for each motor pulse, and the permissible remaining distance increases by the accumulating distance for each pedal pulse. However, the permissible remaining distance does not exceed the upper limit Lu.

Up to a time immediately before the time t3 when the rotation of the pedal is stopped, the increase and decrease of the aforementioned permissible remaining distance are repeated, however, when the rotation of the pedal is stopped, the permissible remaining distance is only decreased by the consumed distance for each motor pulse. Then, at the time t4, the permissible remaining distance becomes less than the threshold Th. Therefore, as illustrated in (g) in FIG. 5, the assist suppression is outputted at the time t4.

Even after the time t4, the permissible remaining distance is decreased by the consumed distance for each motor pulse, however, when the permissible remaining distance reaches the lower limit of the permissible remaining distance, the permissible remaining distance is no long decreased.

After that, when the present time reaches the time t5 at which the pedaling is restarted and the pedal pulse is outputted, the accumulating distance La is added to the permissible remaining distance that became the lower limit value. However, the permissible remaining distance does not exceed the threshold by the first pedal pulse, and exceeds the threshold by the second pedal pulse. Then, as illustrated in (g) in FIG. 5, the assist allowance is outputted at the time t6.

After that, the phenomena from the time t2 to the time t4 are repeated. In other words, when the vehicle speed converted from the pedal rotation becomes 0 at the time t7 because the pedal pressure is not applied, the permissible remaining distance becomes less than the threshold at the time t9, and the assist suppression instruction is outputted at the time t9, as illustrated in (g) in FIG. 5. The permissible remaining distance is continuously decreased after that, however, when the vehicle stop detection signal becomes "1" at the time t10, the initial value is loaded to the permissible remaining distance register 2008.

When such a configuration is adopted that the assist is restarted only by one pedal pulse after the pedaling is stopped during the running and the assist is suppressed, the assist might be erroneously restarted in response to a pedal pulse that occurs by small fluctuation of the pedaling during the running though the pedaling is not performed actually.

Then, as illustrated in the example of FIG. 5, not so as to restart the assist only by one pedal pulse, a value that is less than the threshold by the accumulating distance or more is set as the lower limit value of the permissible remaining distance. Then, when a predetermined number of pedal pulses (in the example of FIG. 5, "2") or more are outputted, the assist is restarted.

When the pedaling is stopped once and then is restarted, some pedal pulses or more are outputted typically until the vehicle speed converted from the pedal rotation reaches the present vehicle speed and the freewheel is locked and then the pedal torque is actually applied. Therefore, when the pedaling is actually started, the response of the assist does not delay especially.

However, like an initial portion of (a) in FIG. 5, at the starting from the vehicle stop, when the pedaling is started, the pedal torque is applied promptly. Therefore, if the accumulation of the accumulating distance is started from the lower limit of the permissible remaining distance, the response to the rotation of the pedal would delay. Therefore, in order to secure the responsiveness at the starting from the vehicle stop, the initial value of the permissible remaining distance is loaded into the permissible remaining distance register 2008 during the vehicle stop. A value that is equal to or less than the threshold and is greater than the lower limit value of the permissible remaining distance is set as the initial value of the permissible remaining distance.

Furthermore, at the starting after the initialization by the vehicle stop, depending on an angle of the pedal at the vehicle stop, a lot of motor pulses might be outputted before the pedal pulse is initially outputted. In such a case, the permissible remaining distance might be shifted in a negative direction from the initial value of the permissible remaining distance and might be largely shifted to the negative side of the threshold. Then, even when the pedal pulses are outputted and the permissible remaining distance is increased in a positive direction, the permissible remaining distance might not be sufficiently greater than the threshold, and the assist suppression might be instructed soon. In order to avoid such a situation, the initial masking unit 2001 suppresses the accumulation of the consumed distance by the motor pulse until the pedal pulse is initially outputted after the initialization.

Such various constants, in other words, "the upper limit value of the permissible remaining distance", "the lower limit value of the permissible remaining distance", "the initial value of the permissible remaining distance", "accumulating distance", "consumed distance" and "threshold", are designed and set appropriately according to the number of pedal pulses, the number of motor pulses on the design, required protection period (e.g. period for which the assist suppression is instructed), required protection responsiveness, responsiveness of the protection release and the like.

For example, a design example is considered as follows: 0 cm is set as the initial value of the permissible remaining distance, which is a reference position. 1 cm is set as the threshold, which is equal to or slightly greater than the initial value of the permissible remaining distance. When the vehicle runs 20 cm during one pulse of the pedal pulse in the fastest gear position of the transmission, the upper limit value of the permissible remaining distance is, for example, 30 cm, which includes a sufficient margin for the handlebar turning angle, a quantization margin for the motor pulse and the like. The accumulating distance per one pedal pulse is 40 cm, which is double of the distance during one pedal pulse, in order to include more margins. The lower limit value of the permissible remaining distance is 40 cm, which does not slightly reach the threshold even when the accumulating distance is added once from the lower limit value of the permissible remaining distance.

As described above, because the motor has multiple polarities and is connected through a reduction gear with a high reduction ratio, the number of rotation phase detection pulses that are outputted from the hall effect sensors within the motor are typically several hundreds or more per one pedal pulse in the fastest gear position. Because the frequency is too high and there is inconvenience in handling the rotation phase detection pulses by the microcontroller or the like as they are, the wheel rotation input unit 1022 generates the motor pulse by frequency-dividing the rotation phase detection pulses to a ratio, for example, about 10 pulses per one pedal pulse.

When running 20 cm per one pedal pulse, the running distance per one motor pulse is about 20/10=2 cm.

By selecting the respective setting values as described above, the operation as explained in the above explanation can be realized.

Here, 30 cm is selected as the upper limit value of the permissible remaining distance, however, 40 cm, which is the same as the accumulating distance, or longer may be set. However, the assist over-run distance at the stop of the pedal rotation becomes longer for that.

The conventional method for directly comparing speeds or periods cannot suppress the assist even when the speed of the motor (i.e. motor driven wheel), which cannot be permitted originally, is detected because of the detection margins to avoid the erroneous detection. In this embodiment, the integrals of the speeds, in other words, accumulated running distances are compared. Thus, the speed margin is accumulated, however, the limit (i.e. the upper limit and lower limit of the permissible remaining distance) of the accumulated difference (i.e. difference in the distance) is set. Therefore, it is possible to prevent from accumulating the speed margin.

Furthermore, the average speed margin substantially becomes zero, and it is possible to compare the distances with high accuracy, and also perform necessary and sufficient assist suppression. Therefore, even in any vehicle speed, the motor driving is suppressed so that the vehicle does not run the upper limit of the permissible remaining distance or more, and immediately after the pedal stops, the assist suppression is made effective always by a short over-run distance, regardless of the vehicle speed.

Furthermore, this embodiment employs the smoothing filter 1208. Because two cycles of torque ripples caused by pedaling by right and left feet occur per one rotation of the pedal, the smoothing filter 1208 is provided in order to drive by a smoothed assist driving force and with a low consumed power. However, also when the pedaling is stopped, the assist torque does not immediately decrease, and the assist driving continues during a time for a half of the pedal rotation at most. According to this embodiment, when the pedal rotation is stopped, it is possible to immediately suppress the assist driving always by an extremely short over-run distance such as some dozen cm to several tens cm, regardless of the vehicle speed at that time.

In addition, even in a freewheel state, in other words, when the pedal rotation slightly catches up the rotation of the vehicle wheel in the running and pedal torque is not outputted, and when the pedal torque is not outputted because the pedaling is stopped, the torque sensor 103 outputs zero. However, according to this embodiment, when the pedal rotation merely catches up the rotation of the vehicle wheel, the output of the smoothed assist torque continues, and when the pedaling is stopped, it is possible to immediately suppress the assist torque. Accordingly, it is possible to control the presence or absence of the assist torque exactly as the driver intends, and it is also possible to secure the safety and comfort.

In addition, as for the typical electrically assisted bicycle, so-called riding by hopping on one foot is prohibited in which, by performing a running start by putting only one foot on the pedal at the starting and kicking the ground by another foot, the rider rides the bicycle at the starting. This is because, nevertheless the rider has not sit on the saddle and the human body is not unified with the vehicle body, a large torque is applied to the pedal, and only the light vehicle body is suddenly accelerated, and the human body is leaved and only the arms and feet are pulled, accordingly the bicycle staggers and topples down. However, according to this embodiment, even when the riding by hopping on one foot is performed, the pedal slightly rotates each hopping. Therefore, the assist driving does not continue and the large acceleration does not occur. Accordingly, the rider can ride the electrically assisted bicycle much safely.

Furthermore, as one method for riding the bicycle at the starting, so-called one-step riding is performed in which, while the rider depresses the pedal by one foot with his or her weight from the upper and frontward direction, the rider strides the vehicle body and sits on the saddle. In case of the typical bicycle without any assist, this method is a riding method by which the rider can make his or her riding posture within a short time without any waste during the starting. However, in case of the electrically assisted vehicle, because the acceleration force is large, only the light vehicle body is suddenly accelerated nevertheless the pedal depressed by one foot reaches the bottom dead center without delay, and one foot that depresses the pedal is pulled and swept out. Accordingly, the bicycle may stagger or topple down. However, according to this embodiment, when the pedal rotation stops at the bottom dead center, the assist is immediately suppressed, then the safety riding can be made.

Furthermore, when the slip is detected by detecting the abnormal acceleration of the motor driven wheel like the conventional technique, it is impossible to detect, in a moment, the slip because of the trade-off between the highly accurate detection of the acceleration and the low delay detection, and it is difficult to determine the end of the slip. On the other hand, when this embodiment is applied, the assist torque is suppressed in a moment by the slight over-rotation due to the slip of the vehicle wheel. Therefore, the slip is immediately prevented. In addition, even when returning from the slip, it is possible to immediately restore the assist torque.

Moreover, according to this embodiment, even if the torque is applied to the pedal and the value of the torque sensor output is sufficiently great, the assist torque is not transmitted to the motor when the pedal does not rotate. Therefore, for example, in case where the front wheel is the motor-driven wheel, even when the pedaling is performed in a state where the rear wheel, which is the pedal-driven wheel, is locked by the key, the pedal cannot rotate, however, the large torque is applied. Therefore, the over-rotation of the motor-driven wheel might occur. However, according to this embodiment, because there is no rotation of the pedal, such over-rotation can be avoided. Furthermore, even when any fault such as a malfunction of the torque sensor occurred and the input of the large torque is erroneously recognized, the assist driving is suppressed to the assist driving corresponding to the rotation of the pedal and the over-rotation can be suppressed.

In the above explanation, the consumed distance, accumulating distance and permissible remaining distance are defined based on the running distance per one pulse in order to prioritize the understandability. However, only the unity of the referenced physical unit is required. Regardless of the unit name or proportional constants, for example, the accumulating angle, consumed angle and permissible remaining angle may be defined and used based on a pedal rotation angle or a rotation angle of the vehicle wheel.

Embodiment 2

Figure 6:
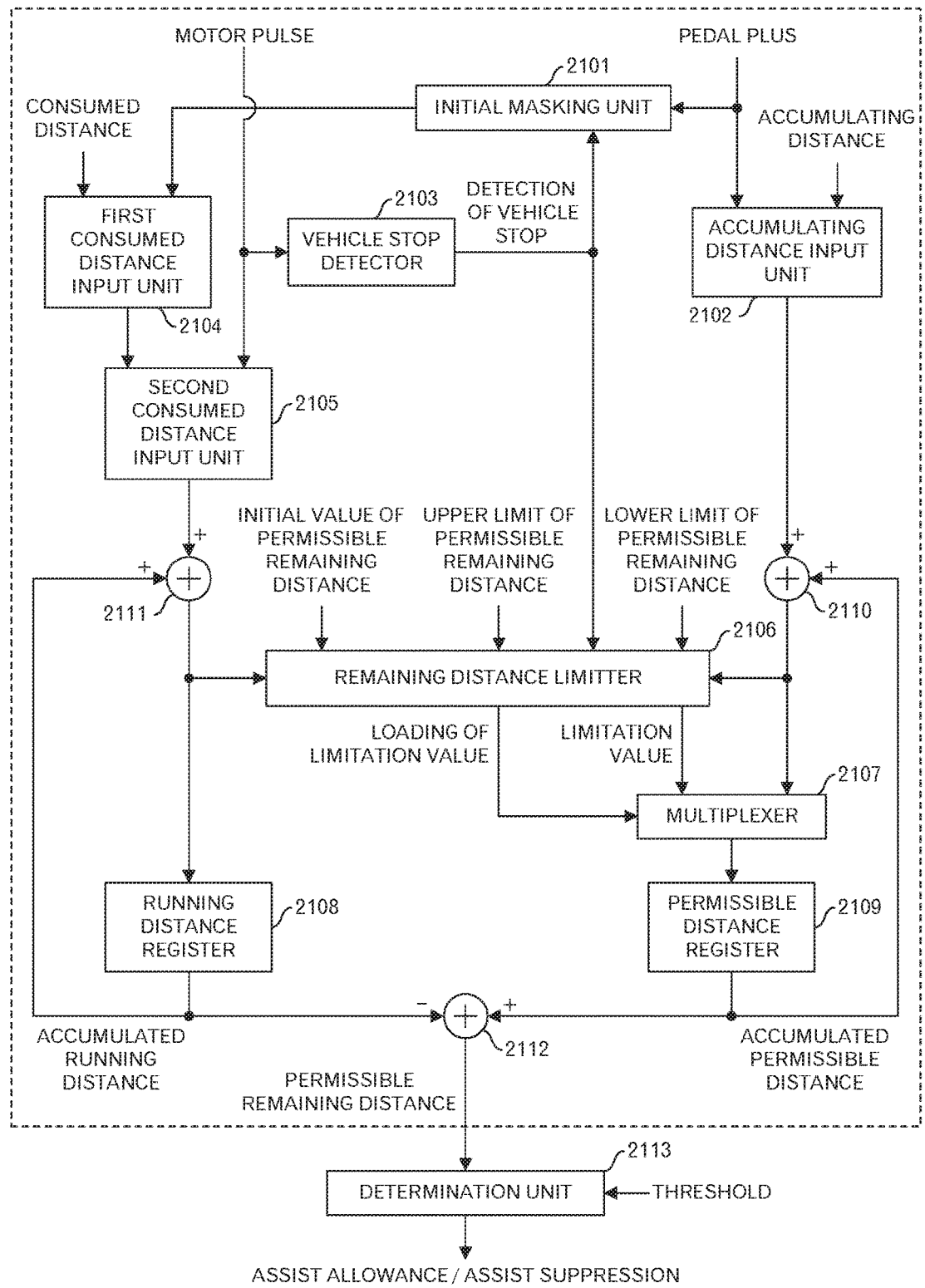
FIG. 6 is a functional block diagram of an assist suppression controller relating to a second embodiment.

FIG. 6 illustrates a configuration example of the assist suppression controller 1210 relating to this embodiment. The assist suppression controller 1210 relating to this embodiment has an initial masking unit 2101, an accumulating distance input unit 2102, a vehicle stop detector 2103, a first consumed distance input unit 2104, a second consumed distance input unit 2105, a remaining distance limitter 2106, a multiplexer 2107, a running distance register 2108, a permissible distance register 2109, a determination unit 2113, and adders 2110 to 2112.

The accumulating distance input unit 2102 outputs the accumulating distance in response to the pedal pulse outputted from the pedal rotation sensor 104 according to the rotations of the pedal. The accumulating distance is the same as that in the first embodiment.

When the adder 2110 receives the accumulating distance from the accumulating distance input unit 2102, the adder 2110 adds the accumulating distance and the output (called "accumulated permissible distance") of the permissible distance register 2109, and outputs the addition result to the remaining distance limitter 2106 and the multiplexer 2107. Thus, the adder 2110 performs the addition for each pedal pulse.

The multiplexer 2107 selects either of the addition result of the adder 2110 and a limitation value, which is outputted by the remaining distance limitter 2106, according to an instruction from the remaining distance limitter 2106, and outputs the selected value to the permissible distance register 2109. The permissible distance register 2109 stores the output from the multiplexer 2107.

On the other hand, the motor pulse is a pulse signal that is frequency-divided by the wheel rotation input unit 1022, for example, and is inputted into the second consumed distance input unit 2105 and the vehicle stop detector 2103. The vehicle stop detector 2103 has a counter for measuring the intervals of the motor pulses. Then, when the vehicle stop detector 2103 detects a phenomenon that the interval of the motor pulse becomes long so that the counter is saturated, the vehicle stop detector 2103 determines that the electrically assisted vehicle stops, and outputs the vehicle stop detection signal to the initial masking unit 2101 and the remaining distance limitter 2106.

Initially or after the initial masking unit 2101 receives the vehicle stop detection signal from the vehicle stop detector 2103, the initial masking unit 2101 outputs a suppression signal to cause the adder 2111 not to perform the calculation to the first consumed distance input unit 2104 until the pedal pulse is detected. On the other hand, when the initial masking unit 2101 detects the pedal pulse after receiving the vehicle stop detection signal from the vehicle stop detector 2103, the initial masking unit 2101 outputs the allowance signal to the first consumed distance input unit 2104 in order to cause the adder 2111 to perform the calculation.

When the allowance signal is inputted from the initial masking unit 2101, the first consumed distance input unit 2104 outputs the consumed distance to the second consumed distance input unit 2105. On the other hand, when the suppression signal is inputted from the initial masking unit 2101, the first consumed distance input unit 2104 outputs the suppression signal to the second consumed distance input unit 2105. The consumed distance is the same as that in the first embodiment.

When the second consumed distance input unit 2105 has received the consumed distance from the first consumed distance input unit 2104 and receives the motor pulse, the second consumed distance input unit 2105 outputs the consumed distance to the adder 2111. On the other hand, when the suppression signal is received from the first consumed distance input unit 2104, the second consumed distance input unit 2105 outputs zero to the adder 2111.

The adder 2111 adds, for each motor pulse, the output (called "accumulated running distance") of the running distance register 2108 and the output (consumed distance or zero) from the second consumed distance input unit 2105, and outputs the addition result to the remaining distance limitter 2106 and the running distance register 2108.

The running distance register 2108 stores the output from the adder 2111. The running distance register 2108 stores the accumulated running distance presumed simply from the motor pulses.

The adder 2112 calculates the permissible remaining distance by subtracting the accumulated running distance stored in the running distance register 2108 from the accumulated permissible distance from the permissible distance register 2109, and outputs the calculation result to the determination unit 2113. The adder 2112 performs the calculation for each motor pulse.

The determination unit 2113 compares the output (i.e. permissible remaining distance) of the adder 2112 with the threshold, and when the permissible remaining distance is equal to or less than the threshold, the determination unit 2113 outputs the assist suppression instruction, and when the permissible remaining distance exceeds the threshold, the determination unit 2113 outputs the assist allowance instruction. The determination unit 2113 performs the processing for each of its own calculation frame periods instead of the motor pulse or pedal pulse. Moreover, elements included in a range surrounded by the dotted line perform their operations for each motor pulse or pedal pulse.

In this embodiment, the remaining distance limitter 2106 adjusts the value stored in the permissible distance register 2109 by using, as a reference, the accumulated running distance so that the accumulated permissible distance is within a range from a value that is calculated by subtracting the lower limit of permissible remaining distance from the accumulated running distance to a value that is calculated by adding the upper limit of the permissible remaining distance to the accumulated running distance.

In other words, the remaining distance limitter 2106 causes the multiplexer 2107 to select the output of the adder 2110 when the remaining distance that is obtained by subtracting the output of the adder 2111 from the output of the adder 2110 is equal to or greater than the lower limit of the permissible remaining distance and is equal to or less than the upper limit of the permissible remaining distance. On the other hand, when the remaining distance is less than the lower limit of the permissible remaining distance, the remaining distance limitter 2106 outputs the result of adding the lower limit of the permissible remaining distance to the output of the adder 2111 as the limitation value to cause the multiplexer 2107 to select it. Furthermore, when the remaining distance is greater than the upper limit of the permissible remaining distance, the remaining distance limitter 2106 outputs the result of adding the upper limit of the permissible remaining distance to the output of the adder 2111 as the limitation value to cause the multiplexer 2107 to select it.

When the vehicle stop detection signal is received from the vehicle stop detector 2103, the remaining distance limitter 2106 outputs the result of adding the initial value of the permissible remaining distance to the output of the adder 2111 as the limitation value to cause the multiplexer 2107 to select it. When the vehicle stop detection signal is not received from the vehicle stop detector 2103, the aforementioned determination and calculation are performed.

This embodiment is different from the first embodiment, and by using two registers that hold values that gradually increase, temporal changes of the accumulated running distance and the accumulated permissible distance are obtained as illustrated in FIGS. 7A to 7D. FIGS. 7A to 7D are added to (a) to (g) in FIG. 5 in correlation with the same times t1 to t10. At that time, the value of the accumulated permissible distance is controlled by the remaining distance limitter 2106 so that the permissible remaining distance obtained by the adder 2112 that calculates the difference between outputs of these two registers is within a range from the lower limit of the permissible remaining distance to the upper limit of the permissible remaining distance on a basis of the accumulated running distance. Therefore, the wave form of the permissible remaining distance is the same as that of the permissible remaining distance in the first embodiment as illustrated in (f) in FIG. 5, and other values are the same as those in the first embodiment.

Figure 7A:
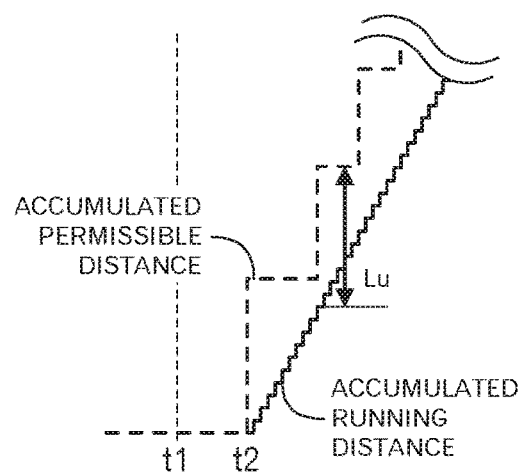
FIG. 7A is a diagram to explain processing contents relating to the second embodiment.

Firstly, FIG. 7A illustrates the temporal changes of the accumulated running distance and the accumulated permissible distance in a period for about 4 pedal pulses since the time t1 in FIG. 5. The accumulated running distance and the accumulated permissible distance do not change up to the time t2 when the initial pedal pulse is inputted though the vehicle starts at the time t1. When the pedal pulse is inputted, the accumulated permissible distance increases step-wise from the accumulated running distance to the upper limit Lu of the permissible remaining distance. The accumulated running distance gradually increases according to the motor pulses.

Figure 7D:
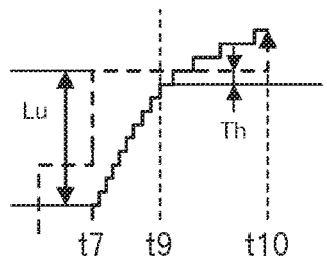
FIG. 7D is a diagram to explain processing contents relating to the second embodiment.
Figure 7B:
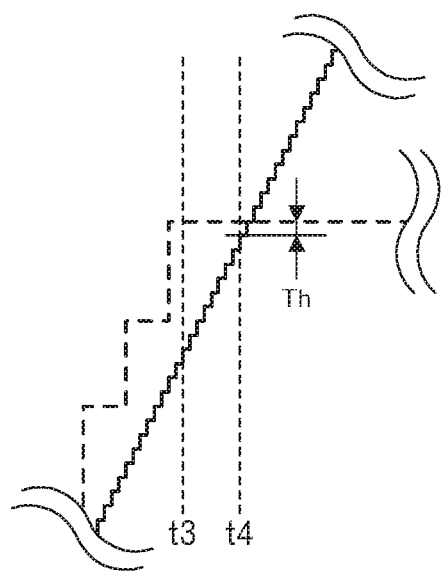
FIG. 7B is a diagram to explain processing contents relating to the second embodiment.

After that, when the rotation of the pedal is stopped at the time t3, the accumulated permissible distance does not increase as illustrated in FIG. 7B. However, the accumulated running distance increases until the vehicle stops. Then, because the permissible remaining distance that is obtained by subtracting the accumulated running distance from the accumulated permissible distance is equal to or less than the threshold Th at the time t4, the assist suppression instruction is outputted. After this, the accumulated permissible distance does not change until the permissible remaining distance reaches the lower limit of the permissible remaining distance, and when the permissible remaining distance reaches the lower limit of the permissible remaining distance, the accumulated permissible distance gradually increase together with the accumulated running distance.

Figure 7C:
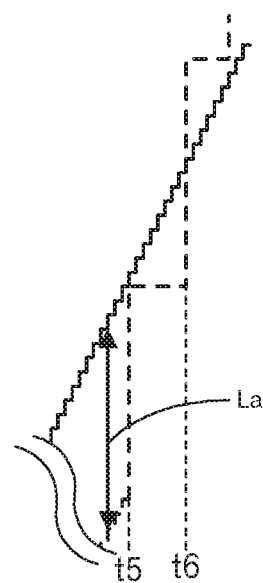
FIG. 7C is a diagram to explain processing contents relating to the second embodiment.

After that, when the rotation of the pedal restarts at the time t5 and the pedal pulse is outputted, the accumulated permissible distance increases by the accumulating distance La as illustrated in FIG. 7C. Furthermore, at the next pedal pulse, the accumulated permissible distance further increases by the accumulating distance La. Then, the accumulated permissible distance exceeds the threshold Th, therefore, the assist allowance is instructed. The accumulated running distance continuously increases by the consumed distance according to the rotations of the motor during that period.

Furthermore, when the vehicle speed converted from the pedal rotation becomes zero because the torque is not applied at the time t7, the accumulated permissible distance becomes constant because there is no pedal pulse as illustrated in FIG. 7D. However, when the state changes to the vehicle stop state and the vehicle stop detection signal is outputted at the time t10, the accumulated permissible distance is set to be the same as the accumulated running distance so that the permissible remaining distance becomes the initial value of the permissible remaining distance.

Thus, even when two registers are used, it is possible to instruct the assist suppression and assist allowance, appropriately.

The remaining distance limitter 2106 adjusts the value of the permissible distance register 2109 in accordance with the value of the running distance register 2108 so that the permissible remaining distance is within a range from the upper limit to the lower limit, and performs adjustment at the vehicle stop so that the permissible remaining distance becomes the initial value. However, on the contrary, the value of the running distance register 2108 may be adjusted based on the value of the permissible distance register 2109. Furthermore, both values of the permissible distance register 2109 and the running distance register 2108 may be adjusted.

Moreover, as another adjustment method, the values of both registers may be left without any adjustment, an offset register and an adder may be provided so that the permissible remaining distance that is difference therebetween becomes a desired value, and by adding the difference between the values of both registers to the value of the offset register, a desired permissible remaining distance may be obtained.

Because the registers of the accumulated permissible distance and the accumulated running distance infinitely accumulate values, it appears that infinite digits are required. However, because the permissible remaining distance that is difference therebetween is actually limited within a range from the upper limit to the lower limit, the difference does not go out of a negative or positive constant range. Therefore, there is no need to prepare the infinite digits, and it is sufficient that the registers cover a range that is double of {(the upper limit of the permissible remaining distance)−(the lower limit of the permissible remaining distance)} or more and the registers have just $2^n$ LSB (Least Significant Bit) range (n is a natural number.). When the difference is calculated by the complement of 2, the value automatically falls within a range from the upper limit to the lower limit.

Embodiment 3

Figure 8:
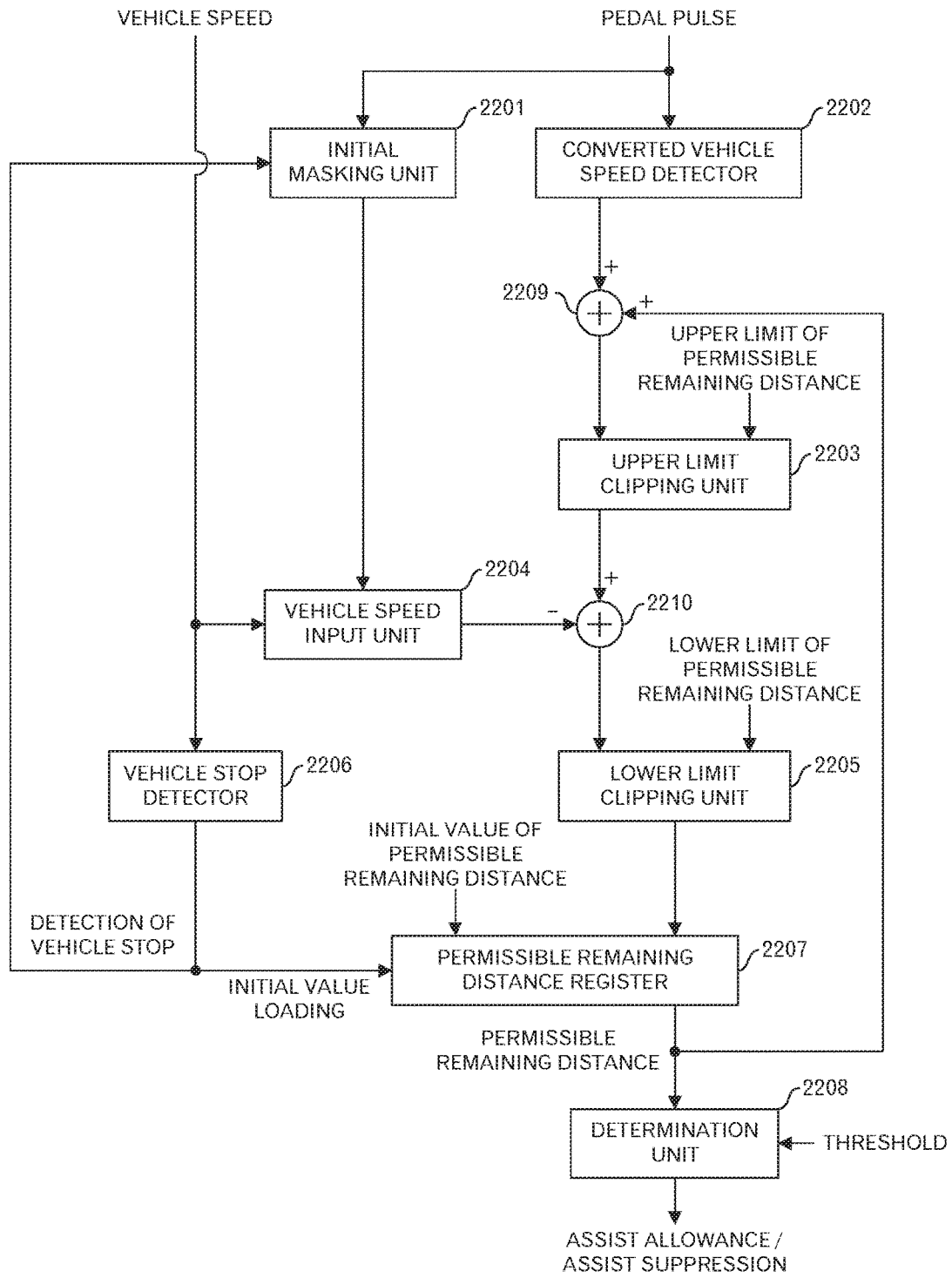
FIG. 8 is a functional block diagram of an assist suppression controller relating to a third embodiment.

FIG. 8 illustrates a configuration example of the assist suppression controller 1210 relating to this embodiment. The assist suppression controller 1210 relating to this embodiment has an initial masking unit 2201, a converted vehicle speed detector 2202, an upper limit clipping unit 2203, a vehicle speed input unit 2204, a lower limit clipping unit 2205, a vehicle stop detector 2206, a permissible remaining distance register 2207, a determination unit 2208 and adders 2209 and 2210.

Instead of performing calculation using the fixed accumulating distance and consumed distance for each one pulse of the pedal and motor pulses, a processing to integrate the vehicle speed converted from the pedal rotation and vehicle speed is performed at intervals of a constant calculation frame time (e.g. 150 Hz) in the third embodiment. The vehicle speed converted from the pedal rotation is considered to be a periodically accumulating distance for each one calculation frame, and the vehicle speed (specifically, speed converted from the motor-driven wheel rotation) is considered to be a periodically consumed distance for each one calculation frame. Accordingly, a value that is calculated by subtracting the consumed distance for each one calculation frame from the accumulating distance for each one calculation frame is accumulated in one same permissible remaining distance register 2207 for each calculation frame.

Therefore, the converted vehicle speed detector 2202 calculates the vehicle speed converted from the pedal rotation based on the intervals of the pedal pulses, and outputs the calculated value to the adder 2209. Margins are added to the vehicle speed converted from the pedal rotation assuming the fastest gear. When the intervals of the pedal pulses become equal to or greater than a predetermined interval or when the pedal reversely rotates, the vehicle speed converted from the pedal rotation becomes zero.

The adder 2209 adds the output (i.e. permissible remaining distance) of the permissible remaining distance register 2207 and the vehicle speed converted from the pedal rotation, and outputs the addition result to the upper limit clipping unit 2203.

When the upper limit clipping unit 2203 receives the output from the adder 2209, the upper limit clipping unit 2203 compares the upper limit of the permissible remaining distance with the output of the adder 2209, and when the output from the adder 2209 is less, the upper limit clipping unit 2203 outputs the output from the adder 2209 to the adder 2210, and when the upper limit of the permissible remaining distance is less, the upper limit clipping unit 2203 outputs the upper limit of the permissible remaining distance to the adder 2210. The upper limit of the permissible remaining distance is the same as that in the first embodiment.

On the other hand, the vehicle speed outputted from the vehicle speed input unit 1024 is inputted to the vehicle speed input unit 2204 and the vehicle stop detector 2206. When the vehicle speed inputted from the vehicle speed input unit 1024 represents zero (e.g. when the interval of the motor pulse becomes equal to or longer than a time for which the value of the counter in the vehicle speed input unit 1024 saturates), the vehicle stop detector 2206 determines that the electrically assisted vehicle stops, and outputs the vehicle stop detection signal to the initial masking unit 2201. The vehicle stop detection signal is also outputted to the permissible remaining distance register 2207, however, in such a case, this signal is used as the initial value loading signal.

Initially or after the initial masking unit 2201 receives the vehicle stop signal from the vehicle stop detector 2206, the initial masking unit 2201 outputs a suppression signal for causing the adder 2210 not to perform the calculation to the vehicle speed input unit 2204 until the pedal pulse is detected. On the other hand, when the initial masking unit 2201 detects the pedal pulse after receiving the vehicle stop detection signal from the vehicle stop detector 2206, the initial masking unit 2201 outputs the allowance signal to cause the adder 2210 to perform the calculation to the vehicle speed input unit 2204.

When the allowance signal is inputted from the initial masking unit 2201, the vehicle speed input unit 2204 outputs the vehicle speed to the adder 2210. On the other hand, when the suppression signal is inputted from the initial masking unit 2201, the vehicle speed input unit 2204 outputs zero to the adder 2210.

The adder 2210 outputs a value calculated by subtracting the output value (zero or vehicle speed) from the vehicle speed input unit 2204 from the value outputted from the upper limit clipping unit 2203 to the lower limit clipping unit 2205.

The lower limit clipping unit 2205 compares the output from the adder 2210 with the lower limit of the permissible remaining distance, and when the output from the adder 2210 is less than the lower limit of the permissible remaining distance, the lower limit clipping unit 2205 outputs the lower limit of the permissible remaining distance to the permissible remaining distance register 2207.

On the other hand, when the output from the adder 2210 is equal to or greater than the lower limit of the permissible remaining distance, the lower limit clipping unit 2205 outputs the output from the adder 2210 to the permissible remaining distance register 2207 as it is. The lower limit of the permissible remaining distance is the same as that in the first embodiment. In addition, the initial value of the permissible remaining distance is the same as that in the first embodiment.

The permissible remaining distance register 2207 is a delay register for each calculation frame, and outputs a value before the one calculation frame to the determination unit 2208 and the adder 2209. When the vehicle stop detector 2206 outputs the vehicle stop detection signal, the initial value of the permissible remaining distance is loaded to the permissible remaining distance register 2207. The determination unit 2208 compares the output (i.e. permissible remaining distance) of the permissible remaining distance register 2207 with the threshold, and when the permissible remaining distance is equal to or less than the threshold, the determination unit 208 outputs the assist suppression instruction, and when the permissible remaining distance exceeds the threshold, the determination unit 2208 outputs the assist allowance instruction.

Figure 9:
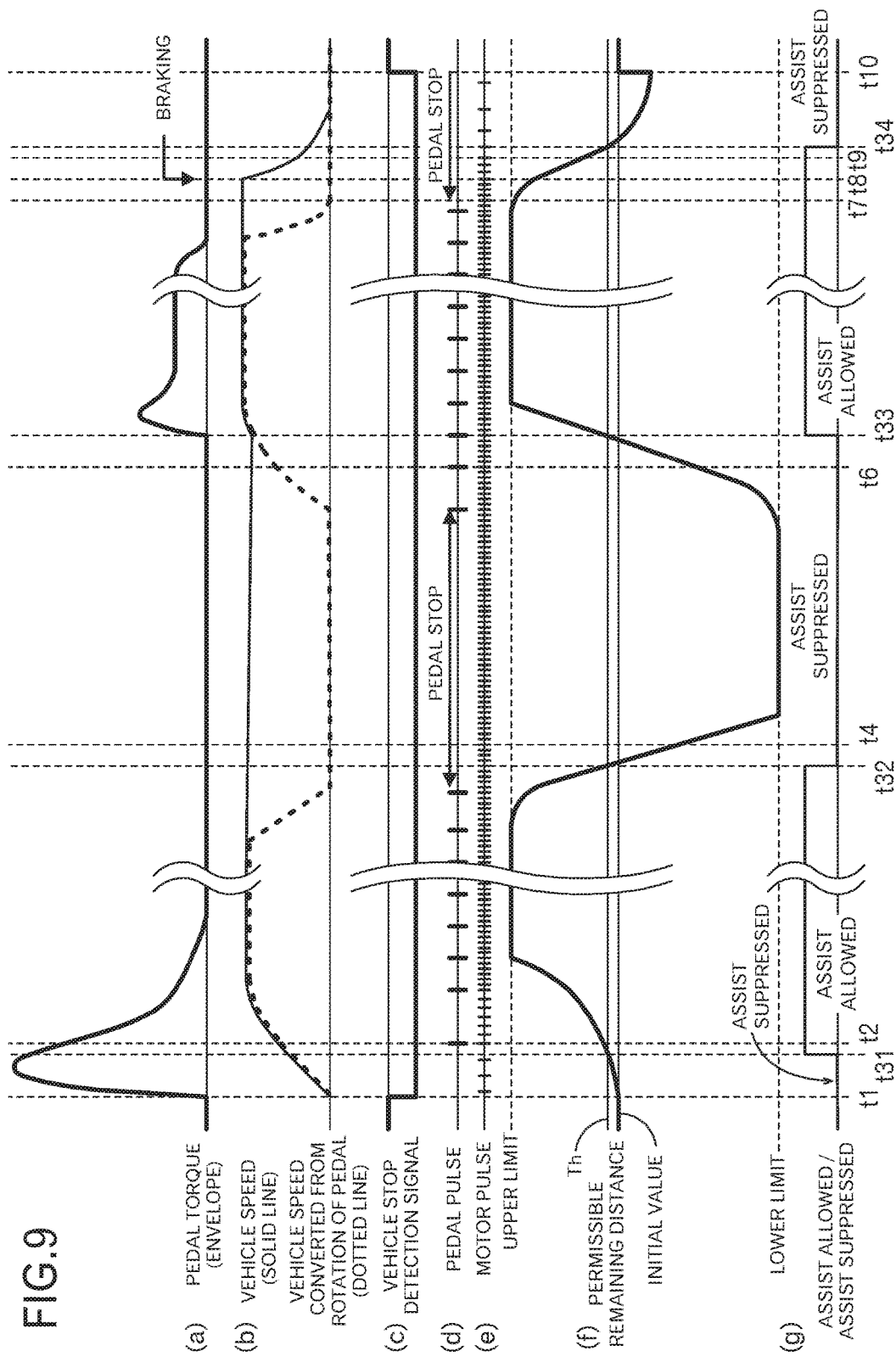
FIG. 9 is a diagram to explain processing contents relating to the third embodiment.

FIG. 9 illustrates an operation example of the assist suppression controller 1210 in the same case as that in FIG. 5, which was explained in the first embodiment.

The waveforms that are different from those in the first embodiment are depicted in (f) and (g), and the permissible remaining distance smoothly increases and decreases. Therefore, a switching timing between the assist suppression and the assist allowance is slightly changed. Specifically, the initial switching timing from the assist suppression to the assist allowance is time t31, which is slightly early. In addition, the initial switching timing from the assist allowance to the assist suppression is time t32, which is changed from the time t4. A point that the permissible remaining distance does not exceed the upper limit of the permissible remaining distance and a point that the permissible remaining distance does not fall below the lower limit of the permissible remaining distance are also applied.

The permissible remaining distance when the rotation of the pedal is restarted after stopping the rotation of the pedal also smoothly increases from the lower limit thereof. Therefore, the next switching timing from the assist suppression to the assist allowance is also changed from the time t6 to time t33. In addition, in the first embodiment, the switching between the assist suppression and the assist allowance may repeatedly occur according to the pedal rotation. However, in the third embodiment, because the permissible remaining distance smoothly increases, a case is prevented where the switching between the assist suppression and the assist allowance is frequently performed in a short time.

Even after the rotation of the pedal is stopped again, the permissible remaining distance smoothly decreases, and then, the mode is switched from the assist allowance to the assist suppression. This timing is also changed from the time t9 to time t34. When the vehicle stop detector 2206 outputs the vehicle stop detection signal at the same timing, the initial value of the permissible remaining distance is loaded to the permissible remaining distance register 2207 at the same timing t10 in this embodiment.

By employing such a configuration, almost all of the other processing in the microcontroller are synchronously executed for each calculation frame. Therefore, this aforementioned processing is highly compatible with the other processing, and the load of the microcontroller is sufficiently light. More specifically, in case of the first and second embodiments, in a portion that is surrounded by a dotted line and in which the processing is performed for each pulse, the frequency of the motor pulse becomes very high when the vehicle speed becomes fast. Therefore, the processing may be performed by using a high-speed interrupt or high-speed microcontroller may be employed, or the motor pulses are frequency-divided to generate pulses in a low frequency. In case of frequency-dividing, the interval between pulses becomes long. Therefore, the minimum step of the consumed distance that is accumulated step-wise becomes large and the margin is increased. Accordingly, the shortest overrun setting may become longer. On the other hand, in this embodiment, regardless of the vehicle speed, the processing is synchronously performed always in a low and constant frequency, similarly to the other processing. Therefore, when information on the vehicle speed is sufficiently accurately represented by sufficient digital bits, it is possible to obtain very high accuracy, and it is also possible to suppress the assist by a very short overrun distance, for example, some dozen cm.

In the first and second embodiments, the accumulation is performed for each pulse, and in the third embodiment, the accumulation of the speed is performed for each fixed period. However, these may be combined. For example, the accumulation of the accumulating distance in the second embodiment and the accumulation of the consumed distance for each fixed period may be combined. Similarly, the inverse combination may be employed.

Embodiment 4

Figure 10:
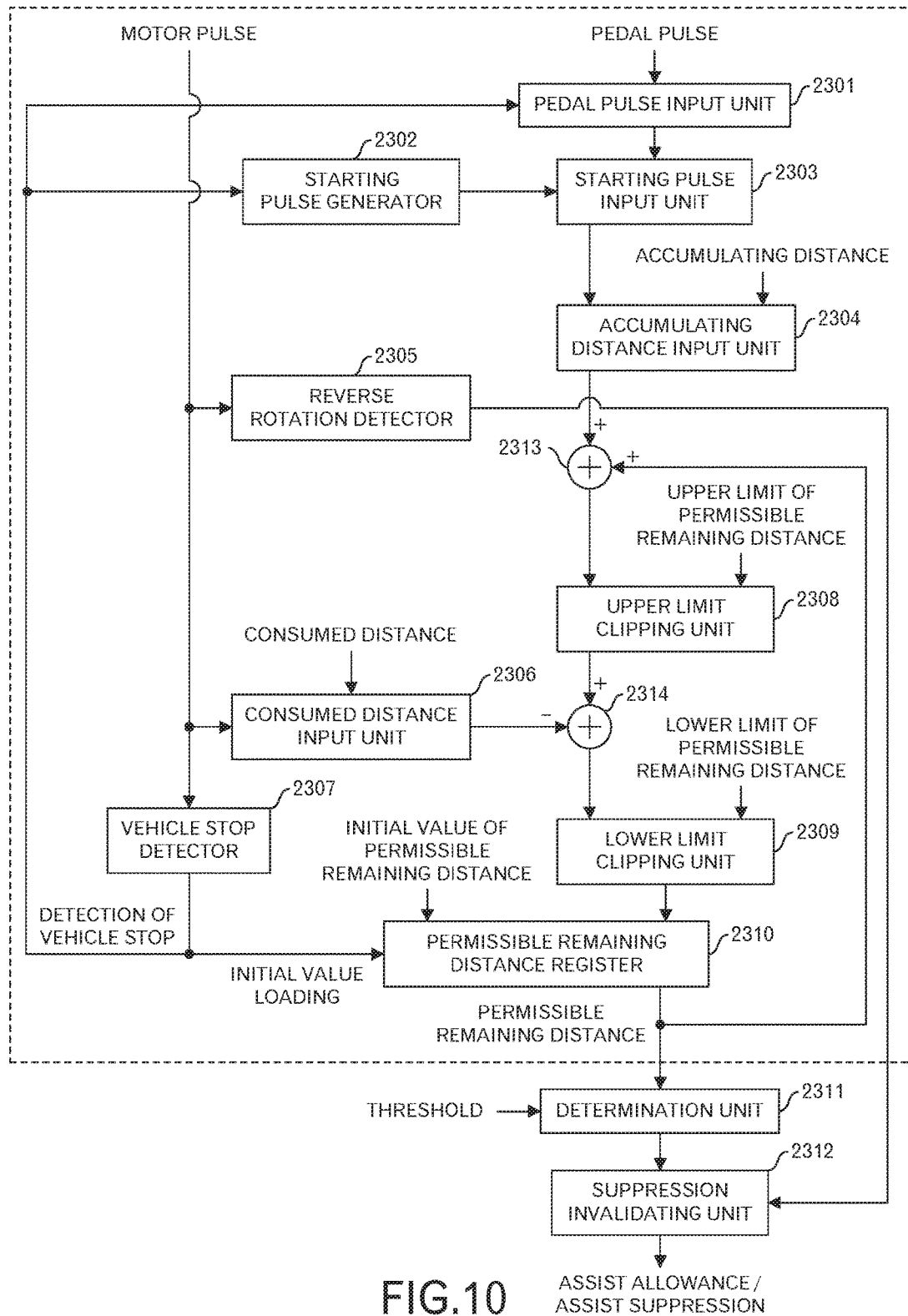
FIG. 10 is a functional block diagram of an assist suppression controller relating to a fourth embodiment.

FIG. 10 illustrates a configuration example of the assist suppression controller 1210 relating to this embodiment. The assist suppression controller 1210 relating to this embodiment includes a pedal pulse input unit 2301, a starting pulse input unit 2303, a starting pulse generator 2302, an accumulating distance input unit 2304, a reverse rotation detector 2305, a consumed distance input unit 2306, a vehicle stop detector 2307, an upper limit clipping unit 2308, a lower limit clipping unit 2309, a permissible remaining distance register 2310, a determination unit 2311, and a suppression invalidating unit 2312 and adders 2313 and 2314.

In this embodiment, two means are introduced, one is means for improving responsiveness of the assist and another is means for invalidating the assist suppression instruction in case where the electrically assisted vehicle backed.

For this reason, the pedal pulse input unit 2301 outputs the pedal pulses to the starting pulse input unit 2303 in a state where the vehicle stop signal from the vehicle stop detector 2307 is off, in other words, while the stop is not detected. In addition, the starting pulse generator 2302 outputs only one starting pulse to the starting pulse input unit 2303 at a timing when the vehicle stop detection signal becomes off after the vehicle stop detection signal was outputted. The starting pulse input unit 2303 outputs the pedal pulses from the pedal pulse input unit 2301 and the pulse from the starting pulse generator 2302 to the accumulating distance input unit 2304.

If the pedal rotation sensor 104 that outputs pedal pulses even when the pedal reversely rotates, the pedal pulse input unit 2301 blocks the pedal pulses that represent the reverse rotation of the pedal when the pedal pulses that represents the reverse rotation of the pedal is inputted.

The accumulating distance input unit 2304 outputs the accumulating distance according to the pedal pulses outputted according to the pedal rotations from the pedal rotation sensor 104 or the pulse from the starting pulse generator 2302. The accumulating distance is the same as that in the first embodiment.

When the adder 2313 receives the accumulating distance from the accumulating distance input unit 2304, the adder 2313 adds the accumulating distance and the output of the permissible remaining distance register 2310, and outputs the addition result to the upper clipping unit 2308. Thus, the adder 2313 also performs the addition for each pedal pulse, similarly to the first embodiment.

When the upper limit clipping unit 2308 receives the output from the adder 2313, the upper limit clipping unit 2308 compares the output of the adder 2313 with the upper limit of the permissible remaining distance, and when the output of the adder 2313 is less than the upper limit of the permissible remaining distance, the upper limit clipping unit 2308 outputs the output from the adder 2313 to the adder 2314, and when the upper limit of the permissible remaining distance is less than the output of the adder 2313, the upper limit clipping unit 2308 outputs the upper limit of the permissible remaining distance to the adder 2314. The upper limit of the permissible remaining distance is the same as that in the first embodiment.

On the other hand, in this embodiment, the motor pulses are inputted to the reverse rotation detector 2305, the consumed distance input unit 2306 and the vehicle stop detector 2307.

When the reverse rotation detector 2305 detects the back (i.e. negative vehicle speed) from the motor pulses, the reverse rotation detector 2305 outputs an invalidation instruction to the suppression invalidating unit 2312.

Similarly to the first embodiment, the vehicle stop detector 2307 has a counter to measure the intervals of the motor pulses, and when a phenomenon is detected that the interval of the motor pulses becomes long to the extent that the count value of the counter is saturated, the vehicle stop detector 2307 determines that the electrically assisted vehicle stops, and outputs the vehicle stop detection signal to the pedal pulse input unit 2301 and the starting pulse generator 2302. On the other hand, as for the starting, in other words, the end of the vehicle stop state, when the vehicle speed becomes a predetermined speed or more, when the number of motor pulses becomes equal to or greater than a predetermined number, in other words, the vehicle moves by a predetermined distance or more, in case where both conditions are satisfied, in other cases where the starting from the vehicle stop state is detected, the vehicle stop detection signal becomes off. The vehicle stop detection signal is also outputted to the permissible remaining distance register 2310, however, in such a case, it is used as the initial value loading signal.

The consumed distance input unit 2306 outputs the consumed distance to the adder 2314 in response to the motor pulse. The adder 2314 outputs a value calculated by subtracting the consumed distance from the consumed distance input unit 2306 from the value outputted from the upper limit clipping unit 2308 to the lower limit clipping unit 2309 in response to the motor pulse.

The lower limit clipping unit 2309 compares the output from the adder 2314 with the lower limit of the permissible remaining distance, and when the output from the adder 2314 is less than the lower limit of the permissible remaining distance, the lower limit clipping unit 2309 outputs the lower limit of the permissible remaining distance to the permissible remaining distance register 2310. On the other hand, when the output from the adder 2314 is equal to or greater than the lower limit of the permissible remaining distance, the lower limit clipping unit 2309 outputs the output from the adder 2314 to the permissible remaining distance register 2310 as it is. The lower limit of the permissible remaining distance is the same as that in the first embodiment.

The permissible remaining distance register 2310 basically stores the output from the lower limit clipping unit 2309. However, when the vehicle stop detector 2307 outputs the vehicle stop detection signal, the initial value of the permissible remaining distance is loaded to the permissible remaining distance register 2310. Moreover, the initial value of the permissible remaining distance is also the same as that in the first embodiment.

Thus, the permissible remaining distance register 2310 is asynchronously updated for each motor pulse or each pedal pulse. In addition, elements within the dotted lines in FIG. 10 operate for each motor pulse or each pedal pulse.

The determination unit 2311 compares the output (i.e. permissible remaining distance) of the permissible remaining distance register 2310 with the threshold, and when the permissible remaining distance is equal to or less than the threshold, the determination unit 2311 outputs the assist suppression instruction, and when the permissible remaining distance exceeds the threshold, the determination unit 2311 outputs the assist allowance instruction. The determination unit 2311 performs a processing for each of its own calculation frames instead of the motor pulse or pedal pulse.

When the suppression invalidating unit 2312 does not received the invalidation instruction from the reverse rotation detector 2305, the suppression invalidating unit 2312 outputs the output of the determination unit 2311 as it is. On the other hand, when receiving the invalidation instruction from the reverse rotation detector 2305, the suppression invalidating unit 2312 invalidates the assist suppression to output the assist allowance instruction.

FIG. 11 illustrates an operation example of the assist suppression controller 1210 in the same case as that in FIG. 5, which was explained in the first embodiment.

In such a case, a point that is different from the first embodiment is an output timing of the assist allowance instruction when the vehicle starts from the vehicle stop state. Specifically, because the pulse is outputted by the starting pulse generator 2302 when the starting is detected based on the motor pulse, the permissible remaining distance is set to be the upper limit at the time t1 as illustrated in (f) of FIG. 11. Then, because the permissible remaining distance exceeds the threshold, the assist allowance instruction is outputted soon at the stage of the time t1 as illustrated in (g) of FIG. 11.

In the above explanation, the accumulating distance is used as an amount to be forcibly accumulated at the starting, however, a value that is greater than the accumulating distance or a value that is slightly less than the accumulating distance may be employed. In addition, instead of accumulating a predetermined accumulating distance at the starting, a predetermined value for the starting may directly be loaded to the permissible remaining distance register 2310. In such a case, loading the initial value of the permissible remaining distance at the vehicle stop may be omitted.

Similarly to the first embodiment, because the accumulation of the consumed distance is not performed by the first pedal pulse, the initial masking unit like the first embodiment may be introduced.

In the first to third embodiments, the explanation was made assuming that the pedal pulses and motor pulses are outputted only when the pedal and motor rotate forward, and they are not outputted when the pedal and motor reversely rotate, similarly to when the vehicle stops. However, when the pedal pulses are outputted during the reverse rotation, the pedal pulse input unit 2301 is introduced like this embodiment to handle a case of the reverse rotation like the pedal stop. Accordingly, it is possible to prevent from cancelling the assist suppression thoughtlessly when the pedal reversely rotates during the vehicle stop.

In addition, in this embodiment, as the countermeasure for the reverse rotation of the motor, the reverse rotation detector 2305 outputs the invalidation instruction to the suppression invalidating unit 2312 when the reverse rotation of the motor (i.e. motor-driven wheel) is detected. Therefore, in spite of the output of the determination unit 2311, the assist suppression instruction is not outputted.

For example, when climbing a steep slope road or when starting on an uphill, a case may occur that the vehicle backs because of lack of a human force and the assist driving force for a moment with respect to the gravity. When the assist is suppressed in such a case, the driving force is only the human driving force by the pedal, and the vehicle further goes backward because the human driving force loses the gravity. Then, by employing a countermeasure that the assist suppression is not performed when the vehicle goes backward like this embodiment, a forward movement by a further strong driving force for resisting against the backward movement due to the gravity is not prevented.

Such a function may be employed in the first to third embodiment.

Furthermore, in this embodiment, the pedal pulses are invalided during the vehicle stop by the pedal pulse input unit 2301. By doing so, even in a configuration that the reverse rotation of the pedal cannot be detected, it is possible to prevent from thoughtlessly cancelling the assist suppression when detecting the reverse rotation of the pedal during the vehicle stop.

Although the embodiments of this invention were explained, this invention is not limited to those. A portion or all of the motor driving control device 102 may be implemented by dedicated circuits, or the aforementioned functions may be implemented by executing, by a microprocessor, programs.

Moreover, the above explanation was made presuming the electrically assisted vehicle, however, the embodiments may be applied to an electrically assisted wheelchair, for example. In such a case, instead of the pedal, a handrim may be used. Anyway, the embodiments may be applied to any mobile apparatus that moves by rotating any component by a handle instead of the pedal to input the torque.

The aforementioned embodiments are outlined as follows:

A motor driving apparatus relating to the embodiments has a driving unit configured to drive a motor according to a torque inputted by a rotation input from a human being; and a controller configured to control driving of the driving unit according to a relationship between an accumulated value of first amounts that correspond to the rotation input from the human being and an accumulated value of second amounts that correspond to rotation of a rotating object driven by the motor.

When the relationship between the accumulated value (e.g. presumed accumulated distance. This may represent other physical amounts.) of the first amounts that correspond to the rotation input (e.g. pedal rotation input) from the human being and the accumulated value of the second amounts (e.g. presumed accumulated distance) that correspond to the rotating object (e.g. vehicle wheel) driven by the motor represents a normal state, the motor driving is normally performed. On the other hand, when the aforementioned relationship does not represent the normal state, in other words, does represent an abnormal state, the motor driving is suppressed. Accordingly, it is possible to suppress a phenomenon such as overdriving of the motor.

The aforementioned controller may be further configured to cause the driving unit to suppress the driving of the motor when an accumulated difference that is calculated by subtracting the accumulated value of the second amounts from the accumulated value of the first amounts is equal to or less than a predetermined threshold. Because the overdriving of the motor was detected, the driving of the motor is suppressed. For example, in case of the electrically assisted vehicle, it becomes possible to control the driving unit to drive the motor only by the rotation of the pedal.

Furthermore, the aforementioned controller may be further configured to suppress accumulation of at least one of the first amounts and the second amounts so that the accumulated difference is within a range from a predetermined lower limit to a predetermined upper limit. The first amounts and second amounts have margins in which various situations are considered, however, by employing such a configuration, it is possible to prevent from accumulating the margins and to compare the accumulated values with high accuracy. Especially, in case of the electrically assisted vehicle, it becomes possible to suppress the assist by a very short overrun distance independently of the speed. In addition, by appropriately setting the lower limit, the responsiveness is kept.

Furthermore, the aforementioned controller may be further configured to perform a setting so that the accumulated difference becomes a predetermined value that is equal to or less than the predetermined threshold and is equal to or greater than the predetermined lower limit, if it is detected that a rotation speed of the rotating object or a speed of a mobile object that moves by the rotating object is zero. With this configuration, when the rotation input from the human being is restarted, the responsiveness becomes high.

Moreover, the aforementioned controller may be further configured to suppress accumulation of the second amounts until accumulation of the first amounts is newly performed after it was detected that the rotation speed of the rotating object or the speed of the mobile object that moved by the rotating object was zero. By doing so, the responsiveness further becomes high.

Furthermore, the aforementioned controller may be further configured to forcibly increase the accumulated value of the first amounts when it is detected that the rotation speed of the rotating object or the speed of the mobile object that moves by the rotating object is not zero after it was detected that the rotation speed of the rotating object or the speed of the mobile object that moved by the rotating object was zero. By doing so, the responsiveness further becomes high.

When the rotation input from the human being drives a second rotating object through a transmission, a ratio of a first amount that is accumulated once to a second amount that is accumulated once may be set to be a constant ratio that corresponds to a fastest gear ratio of the transmission. In case the transmission is provided, when the first amounts and the second amounts are set based on the fastest gear ratio, the motor driving is controlled with sufficient accuracy.

In addition, accumulation of the first amounts may be performed by accumulating a first fixed value for each first pulse generated according to the rotation input from the human being or each second pulse generated based on the first pulse, and accumulation of the second amounts may be performed by accumulating a second fixed value for each third pulse generated according to rotation of the rotating object driven by the motor or each fourth pulse generated based on the third pulse. By effectively utilizing the pulses outputted by a conventional sensor, it becomes possible to suppress the overdriving of the motor.

Furthermore, accumulation of the first amounts may be performed by accumulating a rotation speed relating to the rotation input from the human being for each of fixed intervals, and accumulation of the second amounts may be performed by accumulating a rotation speed of the rotating object driven by the motor for each of the fixed intervals. By doing so, even when the frequency of the pulse is high, the processing is performed at fixed intervals. Therefore, the cost of the arithmetic unit is suppressed, and the computing can be performed stably.

Moreover, the aforementioned controller comprises a single accumulating unit configured to accumulate the first amounts and the second amounts with opposite polarities each other. With this configuration, it becomes possible to lower the cost of the hardware.

In addition, the aforementioned driving unit may include a smoothing unit configured to smooth the torque, and the controller may be further configured to suppress an input of the torque to the smoothing unit or suppress an output of the smoothing unit. With this configuration, it becomes possible to suppress the motor driving quickly.

Moreover, the aforementioned controller may be further configured to cause the driving unit not to suppress the driving of the motor if it is detected that a rotation speed of the rotating object or a speed of a mobile object that moves by the rotating object is negative. This is because, in case of the electrically assisted vehicle, it is not preferable that the motor driving is suppressed in a state where the vehicle backs because of the lack of the torque when climbing an uphill or the like.

Furthermore, the aforementioned controller may be further configured to set zero as the first amounts if the rotation speed relating to the rotation input from the human being is negative. For example, in case of the electrically assisted vehicle, when the pedal is reversely rotated, this state is handled as being stopped.

Furthermore, the aforementioned controller may be further configured to set zero as the first amounts if it is detected that a rotation speed of the rotating object or a speed of a mobile object that moves by the rotating object is zero. For example, in case of the electrically assisted vehicle, when the rotation direction of the pedal cannot be obtained, the pedal is assumed to be stopped when the vehicle stops.

Incidentally, it is possible to create a program causing a microprocessor to execute the aforementioned processing, and such a program is stored in a computer readable storage medium or storage device such as a flexible disk, CD-ROM, DVD-ROM, magneto-optic disk, a semiconductor memory such as ROM (Read Only Memory), and hard disk. In addition, the intermediate processing result is temporarily stored in a storage device such as a RAM (Random Access Memory) or the like.

What is claimed is:

1. A motor driving apparatus, comprising:
 a driving unit configured to drive a motor according to a torque inputted by a rotation input from a human being; and
 a controller configured to control driving of the driving unit according to a relationship between an accumulated value of first amounts that correspond to the rotation input from the human being and an accumulated value of second amounts that correspond to rotation of a rotating object driven by the motor.

2. The motor driving apparatus as set forth in claim 1, wherein the controller is further configured to suppress the driving of the driving unit when an accumulated difference that is calculated by subtracting the accumulated value of the second amounts from the accumulated value of the first amounts is equal to or less than a predetermined threshold.

3. The motor driving apparatus as set forth in claim 2, wherein the controller is further configured to suppress accumulation of at least one of the first amounts and the second amounts so that the accumulated difference is within a range from a predetermined lower limit to a predetermined upper limit.

4. The motor driving apparatus as set forth in claim 3, wherein the controller is further configured to perform a setting so that the accumulated difference becomes a predetermined value that is equal to or less than the predetermined threshold and is equal to or greater than the predetermined lower limit, if it is detected that a rotation speed of the rotating object or a speed of a mobile object that moves by the rotating object is zero.

5. The motor driving apparatus as set forth in claim 4, wherein the controller is further configured to suppress accumulation of the second amounts until accumulation of the first amounts is newly performed after it was detected that the rotation speed of the rotating object or the speed of the mobile object that moved by the rotating object was zero.

6. The motor driving apparatus as set forth in claim 3, wherein the controller is further configured to forcibly increase the accumulated value of the first amounts when it is detected that the rotation speed of the rotating object or a speed of the mobile object that moves by the rotating object is not zero after it was detected that the rotation speed of the rotating object or the speed of the mobile object that moved by the rotating object was zero.

7. The motor driving apparatus as set forth in claim 2, wherein the rotation input from the human being drives a second rotating object through a transmission, and a ratio of a first amount to be accumulated at a time to a second amount to be accumulated at a time is set to be a constant ratio that corresponds to a fastest gear ratio of the transmission.

8. The motor driving apparatus as set forth in claim 2, wherein accumulation of the first amounts is performed by accumulating a first fixed value for each first pulse generated according to the rotation input from the human being or each second pulse generated based on the first pulse, and accumulation of the second amounts is performed by accumulating a second fixed value for each third pulse generated according to rotation of the rotating object driven by the motor or each fourth pulse generated based on the third pulse.

9. The motor driving apparatus as set forth in claim 2, wherein accumulation of the first amounts is performed by accumulating a rotation speed relating to the rotation input from the human being for each of fixed intervals, and accumulation of the second amounts is performed by accumulating a rotation speed of the rotating object driven by the motor for each of the fixed intervals.

10. The motor driving apparatus as set forth in claim 2, wherein the controller comprises a single accumulating unit configured to accumulate the first amounts and the second amounts with opposite polarities each other.

11. The motor driving apparatus as set forth in claim 2, wherein the controller is further configured to cause the driving unit not to suppress the driving of the motor if it is detected that a rotation speed of the rotating object or a speed of a mobile object that moves by the rotating object is negative.

12. The motor driving apparatus as set forth in claim 2, wherein the controller is further configured to set zero as the first amounts if the rotation speed relating to the rotation input from the human being is negative.

13. The motor driving apparatus as set forth in claim 2, wherein the controller is further configured to set zero as the first amounts if it is detected that a rotation speed of the rotating object or a speed of a mobile object that moves by the rotating object is zero.

14. The motor driving apparatus as set forth in claim 1, wherein the driving unit comprises a smoothing unit configured to smooth the torque, and the controller is further configured to suppress an input of the torque to the smoothing unit or suppress an output of the smoothing unit.

15. The motor driving apparatus as set forth in claim 1, wherein the rotating object is a front wheel, and the rotation input from the human being drives a rear wheel.

16. An electrically assisted vehicle, comprising:
 a motor; and
 a motor driving apparatus, comprising:
  a driving unit configured to drive the motor according to a torque inputted by a rotation input from a human being; and
  a controller configured to control driving of the driving unit according to a relationship between an accumulated value of first amounts that correspond to the rotation input from the human being and an accumulated value of second amounts that correspond to rotation of a rotating object driven by the motor.

* * * * *